United States Patent [19]

Gugumus

[11] Patent Number: 5,919,399
[45] Date of Patent: Jul. 6, 1999

[54] SYNERGISTIC STABILIZER MIXTURE

[75] Inventor: François Gugumus, Allschwil, Switzerland

[73] Assignee: Ciba Specialty Chemicals Corporation, Tarrytown, N.Y.

[21] Appl. No.: 08/680,077

[22] Filed: Jul. 15, 1996

[30] Foreign Application Priority Data

Jul. 21, 1995 [CH]  Switzerland ............... 2174/95

[51] Int. Cl.$^6$ .................................. C09K 15/22
[52] U.S. Cl. ..................... 252/403; 252/400.31
[58] Field of Search ............... 252/400.31, 403; 524/96, 100, 102

[56] References Cited

U.S. PATENT DOCUMENTS

| | | | |
|---|---|---|---|
| 3,640,928 | 2/1972 | Murayama | 260/23 |
| 3,925,376 | 12/1975 | Chalmers et al. | 260/248 |
| 4,086,204 | 4/1978 | Cassandrini et al. | 260/45.8 |
| 4,108,829 | 8/1978 | Cassandrini et al. | 260/45.8 |
| 4,110,334 | 8/1978 | Mayer et al. | 260/293.66 |
| 4,331,586 | 5/1982 | Hardy | 525/186 |
| 4,340,534 | 7/1982 | Wiezer et al. | 524/99 |
| 4,356,307 | 10/1982 | Kelkenberg et al. | 546/200 |
| 4,408,051 | 10/1983 | Hinsken et al. | 546/19 |
| 4,477,615 | 10/1984 | Raspanti et al. | 524/100 |
| 4,529,760 | 7/1985 | Feistner et al. | 524/102 |
| 4,689,416 | 8/1987 | Ertt et al. | 546/19 |
| 4,692,486 | 9/1987 | Gugumus | 524/100 |
| 4,857,595 | 8/1989 | Kaymierzak et al. | 525/142 |
| 4,863,981 | 9/1989 | Gugumus | 524/97 |
| 4,957,953 | 9/1990 | Kikkawa et al. | 524/99 |
| 5,021,485 | 6/1991 | Gugumus | 524/100 |
| 5,051,458 | 9/1991 | Castanzi et al. | 524/99 |
| 5,182,390 | 1/1993 | Sagawa et al. | 544/222 |
| 5,204,473 | 4/1993 | Winter et al. | 546/188 |
| 5,439,959 | 8/1995 | Rassamtt | 524/100 |

FOREIGN PATENT DOCUMENTS

| | | |
|---|---|---|
| 0252877 | 1/1988 | European Pat. Off. |
| 0309402 | 3/1989 | European Pat. Off. |
| 0345220 | 12/1989 | European Pat. Off. |
| 0432495 | 6/1991 | European Pat. Off. |
| 0449685 | 10/1991 | European Pat. Off. |
| 0491659 | 6/1992 | European Pat. Off. |
| 0632092 | 1/1995 | European Pat. Off. |
| 262439 | 11/1988 | Germany. |
| 4317672 | 12/1993 | Germany. |
| 5879033 | 5/1983 | Japan. |
| 2267499 | 12/1993 | United Kingdom. |
| 9212201 | 7/1992 | WIPO. |
| 9412544 | 6/1994 | WIPO. |
| 9422946 | 10/1994 | WIPO. |

OTHER PUBLICATIONS

Chem. Abst. 100: 104558n.
Chem. Abst. 109:941995m.
Chem. Abst. 120:324950n.
CHem. Abst. 125:277237b.
Derw. Abst 89–122983/17 of DD 262,439, Nov. 30, 1988.
Chem. Abst. 111:58964u of DD 262,439, Nov. 30, 1988.
Derw. Abst. 94–177274/22 of DE 4239437 & WO94/12544, May 26, 1994.
Materials Safety Data Sheet 136504–96–6, Nov. 1, 1993.
Research Disclosure, Jan. 1993 No. 345.

*Primary Examiner*—Kriellion S. Morgan
*Attorney, Agent, or Firm*—Luther A. R. Hall

[57] ABSTRACT

Stabilizer mixture comprising, for example, a compound of the formula $$H_{17}C_8-O-N\overset{H_3C\ CH_3}{\underset{H_3C\ CH_3}{\diagdown}}O-\overset{O}{\underset{\|}{C}}-(CH_2)_8-\overset{O}{\underset{\|}{C}}-O-\overset{H_3C\ CH_3}{\underset{H_3C\ CH_3}{\diagdown}}N-O-C_8H_{17}$$

and, for example, a compound of the formula

3 Claims, No Drawings

SYNERGISTIC STABILIZER MIXTURE le;2qThe present invention relates to a stabilizer system comprising two specific polyalkylpiperidine derivatives, to the use of this stabilizer system for stabilizing organic material, and to the organic material protected against thermal, oxidative or light-induced degradation by means of the stabilizer system mentioned.

U.S. Pat. No. 4,692,486, U.S. Pat. No. 4,863,981, U.S. Pat. No. 4,957,953, U.S. Pat No. 5,021,485, U.S. Pat. No. 5,439,959, WO-A-92/12 201, WO-A-94/22 946, EP-A-449 685, EP-A-632 092, GB-A-2 267 499 and Research Disclosure 34 549 (January 1993) describe a number of stabilizer mixtures which comprise two polyalkylpiperidine derivatives.

The present invention relates to a stabilizer mixture comprising at least two different compounds from the group consisting of components a), b), c), d), e), f), g), h), i), j), k) and l), where component a) is at least one compound of the formula I

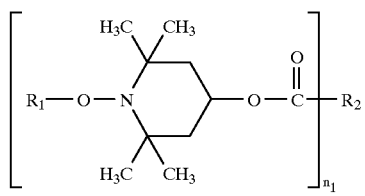

(I)

in which $R_1$ is hydrogen, $C_1$–$C_{18}$alkyl, $C_5$–$C_{12}$cycloalkyl or $C_1$–$C_4$alkyl-substituted $C_5$–$C_{12}$cycloalkyl, $n_1$ is 1, 2 or 4, if $n_1$ is 1, $R_2$ is $C_1$–$C_{25}$alkyl, if $n_1$ is 2, $R_2$ is $C_1$–$C_{14}$alkylene and if $n_1$ is 4, $R_2$ is $C_4$–$C_{10}$alkanetetrayl;

component b) is at least one compound of the formula II

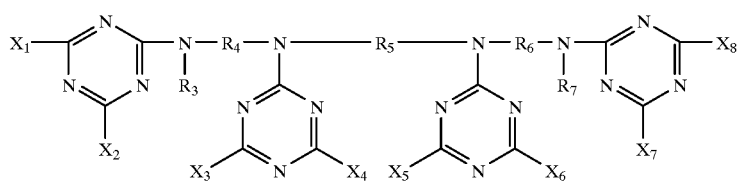

(II)

in which $R_3$ and $R_7$ independently of one another are hydrogen or $C_1$–$C_{12}$alkyl, $R_4$, $R_5$ and $R_6$ independently of one another are $C_2$–$C_{10}$alkylene, and $X_1$, $X_2$, $X_3$, $X_4$, $X_5$, $X_6$, $X_7$ and $X_8$ independently of one another are a group of the formula III,

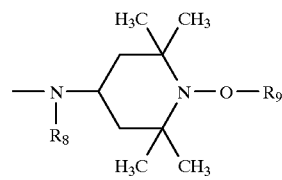

(III)

in which $R_8$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula IV,

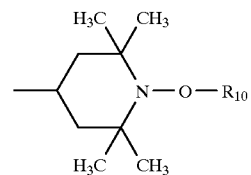

(IV)

and $R_9$ and $R_{10}$ independently of one another are as defined for $R_1$;

component c) is at least one compound of the formula V,

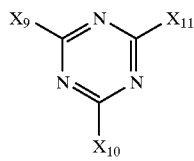

(V)

in which $X_9$, $X_{10}$ and $X_{11}$ independently of one another are a group of the formula III;

component d) is at least one compound of the formula VI,

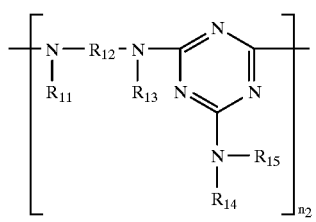
(VI)

in which
- $R_{11}$, $R_{13}$, $R_{14}$ and $R_{15}$ independently of one another are hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula IV,
- $R_{12}$ is $C_1$–$C_{18}$alkylene, $C_5$–$C_7$cycloalkylene or $C_1$–$C_4$alkylenedi($C_5$–$C_7$cycloalkylene), or the radicals $R_{11}$, $R_{12}$ and $R_{13}$, together with the nitrogen atoms to which they are attached, form a 5- to 10-membered heterocyclic ring, or
- $R_{14}$ and $R_{15}$, together with the nitrogen atom to which they are attached, form a 5- to 10-membered heterocyclic ring,
- $n_2$ is a number from 2 to 50, and
- at least one of the radicals $R_{11}$, $R_{13}$, $R_{14}$ and $R_{15}$ is a group of the formula IV;

component e) is at least one compound of the formula VII,

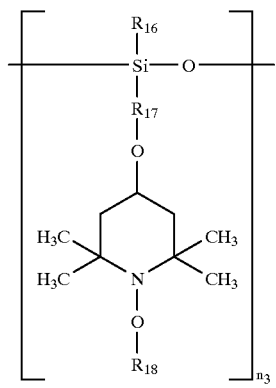
(VII)

in which
- $R_{16}$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl,
- $R_{17}$ is $C_3$–$C_{10}$alkylene,
- $R_{18}$ is as defined for $R_1$, and
- $n_3$ is a number from 1 to 50;

component f) is a product obtainable by reacting a product, obtained by reaction between a polyamine of the formula VIIIa and cyanuric chloride, with a compound of the formula VIIIb to give a triazine derivative which comprises 2,2,6,6-tetramethyl-4-piperidyl groups, and then reacting the 2,2,6,6-tetramethyl-4-piperidyl groups present in the triazine derivative to form groups of the formula VIIIc

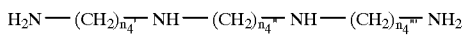
(VIIIa)

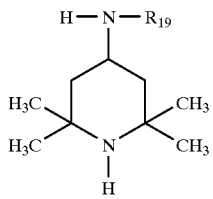
(VIIIb)

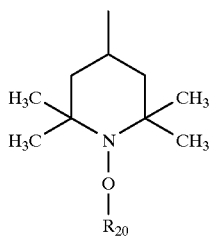
(VIIIc)

in which
- $n_4'$, $n_4''$ and $n_4'''$ independently of one another are a number from 2 to 12,
- $R_{19}$ is hydrogen, $C_1$–$C_{12}$alkyl, $C_5$–$C_{12}$cycloalkyl, phenyl or $C_7$–$C_9$phenylalkyl, and
- $R_{20}$ is as defined for $R_1$;

component g) is at least one compound of the formula IX,

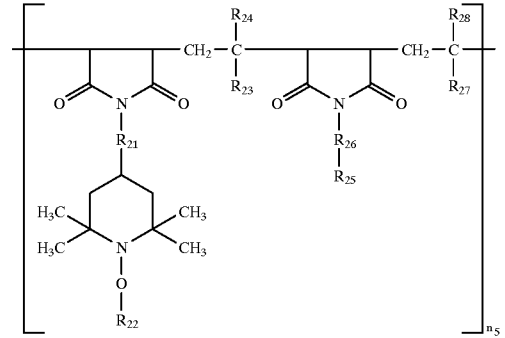
(IX)

in which
- $R_{21}$ and $R_{26}$ independently of one another are a direct bond or a group —N($Y_1$)—CO—$Y_2$—CO—N($Y_3$)—,
- $Y_1$ and $Y_3$ independently of one another are hydrogen, $C_1$–$C_8$alkyl, $C_5$–$C_{12}$cycloalkyl, phenyl, $C_7$–$C_9$phenylalkyl or a group of the formula IV,
- $Y_2$ is a direct bond or $C_1$–$C_4$alkylene,
- $R_{22}$ is as defined for $R_1$,
- $R_{23}$, $R_{24}$, $R_{27}$ and $R_{29}$ independently of one another are hydrogen, $C_1$–$C_{30}$alkyl, $C_5$–$C_{12}$cycloalkyl or phenyl,
- $R_{25}$ is hydrogen, $C_1$–$C_{30}$alkyl, $C_5$–$C_{12}$cycloalkyl, phenyl, $C_7$–$C_9$phenylalkyl or a group of the formula IV, and $n_5$ is a number from 1 to 50;

component h) is at least one compound of the formula X $$\text{(X)}$$

in which $R_{29}$ is $C_1$–$C_{24}$alkyl and $R_{30}$ is as defined for $R_1$;

component i) is at least one compound of the formula XI, $$\text{(XI)}$$

in which $R_{31}$ is as defined for $R_1$ and $n_6$ is a number from 2 to 50;

component j) is at least one compound of the formula XII $$\text{(XII)}$$

in which $R_{32}$ and $R_{33}$ together form $C_2$–$C_{14}$alkylene, $R_{34}$ is hydrogen or a group —$Z_1$—COO—$Z_2$, $Z_1$ is $C_2$–$C_{14}$alkylene and $Z_2$ is $C_1$–$C_{24}$alkyl, and $R_{35}$ is as defined for $R_1$;

component k) is at least one compound of the formula XIII $$\text{(XIII)}$$

in which $R_{36}$, $R_{37}$, $R_{38}$, $R_{39}$ and $R_{40}$ independently of one another are a direct bond or $C_1$–$C_{10}$alkylene, $R_{41}$ is as defined for $R_1$, and $n_7$ is a number from 1 to 50;

component l) is at least one compound of the formula XIV, $$\text{(XIV)}$$

in which $X_{12}$, $X_{13}$ and $X_{14}$ independently of one another are a group of the formula XV, $$—CH_2—CH—CH_2—A \quad \text{(XV)}$$
$$\phantom{—CH_2—CH}|\phantom{—CH_2—A}$$
$$\phantom{—CH_2—CH}OH$$

in which A is a group of the formula III.

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred meanings of $R_{23}$ and $R_{27}$ is $C_1$–$C_{25}$alkyl, especially $C_{15}$–$C_{25}$alkyl, for example hexadecyl and $C_{18}$–$C_{22}$alkyl. One of the preferred meanings of $R_{25}$ is $C_1$–$C_{25}$alkyl, especially octadecyl. One of the preferred meanings of $R_8$ and $R_{19}$ is $C_1$–$C_4$alkyl, especially n-butyl.

Examples of $C_5$–$C_{12}$cycloalkyl are cyclopentyl, cyclohexyl, cycloheptyl, cyclooctyl and cyclododecyl. $C_5$–$C_8$cycloalkyl, especially cyclohexyl, is preferred.

$C_1$–$C_4$alkyl-substituted $C_5$–$C_{12}$cycloalkyl is for example methylcyclohexyl or dimethylcyclohexyl.

—OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$–$C_9$phenylalkyl are benzyl and phenylethyl.

$C_7$–$C_9$phenylalkyl which is substituted on the phenyl radical by —OH and/or by alkyl having up to 10 carbon atoms is, for example, methylbenzyl, dimethylbenzyl, trimethylbenzyl, tert-butylbenzyl or 3,5-di-tert-butyl-4-hydroxybenzyl.

Examples of $C_3$–$C_6$alkenyl are allyl, 2-methallyl, butenyl, pentenyl and hexenyl. Allyl is preferred. The carbon atom in position 1 is preferably saturated.

$C_1$–$C_8$acyl is preferably $C_1$–$C_8$alkanoyl, $C_3$–$C_9$alkenoyl or benzoyl. Examples are formyl, acetyl, propionyl, butyryl, pentanoyl, hexanoyl, octanoyl, benzoyl, acryloyl and crotonoyl.

Examples of alkylene having up to 18 carbon atoms are methylene, ethylene, propylene, trimethylene, tetramethylene, pentamethylene, 2,2-dimethyltrimethylene, hexamethylene, trimethylhexamethylene, octamethylene and decamethylene. $R_{12}$ is preferably hexamethylene, $R_{36}$ and $R_{38}$ are preferably methylene, $R_{39}$ is preferably 2,2-dimethylethylene and $R_{40}$ 1,1-dimethylethylene.

An example of $C_4$–$C_{10}$alkanetetrayl is 1,2,3,4-butanetetrayl.

An example of $C_5$–$C_7$cycloalkylene is cyclohexylene.

An example of $C_1$–$C_4$alkylenedi($C_5$–$C_7$-cycloalkylene) is methylenedicyclohexylene.

Where the radicals $R_{11}$, $R_{12}$ and $R_{13}$, together with the nitrogen atoms to which they are attached, form a 5- to 10-membered heterocyclic ring, the resulting ring is for example

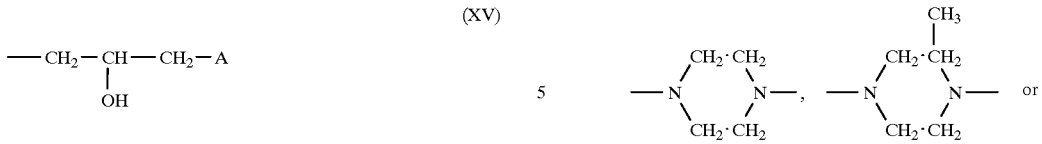

A 6-membered heterocyclic ring is preferred.

Where the radicals $R_{14}$ and $R_{15}$, together with the nitrogen atom to which they are attached, form a 5- to 10-membered heterocyclic ring, the resulting ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred meanings of $R_{23}$ and $R_{27}$ is phenyl. $Y_2$ and $R_{37}$ are preferably a direct bond.

One of the preferred meanings of $Y_1$ and $Y_3$ is hydrogen.

$n_2$ is preferably 2–25.

$n_3$ is preferably 1–25, especially 2–20 or 2–10.

$n_4'$, $n_4''$ and $n_4'''$ are preferably 2–4.

$n_5$ is preferably 1–25, especially 1–20 or 1–10.

$n_6$ is preferably 2–25, especially 2–20 or 2–10.

$n_7$ is preferably 1–25, especially 1–20 or 1–10.

The compounds described as component a) to l) can be prepared, for example, by the method indicated below under "Example of a preparation process", using the corresponding 2,2,6,6-tetramethylpiperidine derivatives (unsubstituted nitrogen in the 2,2,6,6-tetramethyl-4-piperidyl groups) as starting compounds. The 2,2,6,6-tetramethylpiperidine derivatives are essentially known (some are commercially available) and can be prepared by known methods, for example as described in U.S. Pat. No. 3,640,928, U.S. Pat. No. 4,108,829, U.S. Pat. No. 3,925,376, U.S. Pat. No. 4,086,204, U.S. Pat. No. 4,331,586, U.S. Pat. No. 5,051,458, U.S. Pat. No. 4,477,615 and Chemical Abstracts - CAS No. 136 504-96-6, U.S. Pat. No. 4,857,595, DD-A-262 439 (Derwent 89-122 983/17, Chemical Abstracts 111:58 964u), WO-A-94/12 544 (Derwent 94-177 274/22), U.S. Pat. No. 4,356,307, U.S. Pat. No. 4,340,534, U.S. Pat. No. 4,408,051, U.S. Pat. No. 4,689,416, U.S. Pat. No. 4,110,334, U.S. Pat. No. 4,529,760 and U.S. Pat. No. 5,182,390 (Chemical Abstracts - CAS No. 144 923-25-1).

The 2,2,6,6-tetramethylpiperidine derivative starting product belonging to component f) can be prepared in analogy to known methods, for example by reacting a polyamine of the formula VIIIa with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol at a temperature of from −20° C. to +10° C., preferably from −10° C. to +10° C., in particular from 0° C. to +10° C., for from 2 to 8 hours and then reacting the resulting product with a 2,2,6,6-tetramethyl-4-piperidylamine of the formula VIIIb. The molar ratio of 2,2,6,6-tetramethyl-4-piperidylamine to the polyamine of the formula VIIIa which is employed is, for example, from 4:1 to 8:1. The quantity of 2,2,6,6-tetramethyl-4-piperidylamine can be added in one go or in two or more portions at an interval of a few hours.

The ratio of polyamine of the formula VIIIa to cyanuric chloride to 2,2,6,6-tetramethyl-4-piperidylamine of the formula VIIb is preferably from 1:3:5 to 1:3:6.

The following example indicates a possible method of preparing the preferred 2,2,6,6-tetramethylpiperidine derivative starting product which belongs to component f).

EXAMPLE 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted in 250 ml of 1,2-dichloroethane at 5° C. for 3 hours with stirring. The mixture is heated at room temperature for a further 4 hours. 27.2 g (0.128 mol) of N-(2,2,6,6-tetramethyl-4-piperidyl)butylamine are added and the mixture obtained is heated at 60° C. for 2 hours. A further 18 g (0.13 mol) of anhydrous potassium carbonate are added and the mixture is heated at 60° C. for a further 6 hours. The solvent is distilled off under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added and the reaction mixture is heated at reflux for 2 hours, and for a further 12 hours the water produced in the reaction is removed by azeotropic distillation. The mixture is filtered. The solution is washed with water and dried over $Na_2SO_4$. The solvent is evaporated off and the residue is dried in vacuo (0.1 mbar) at 120–130° C. The 2,2,6,6-tetramethylpiperidine derivative starting product belonging to component f) is obtained as a colourless resin.

In general, the 2,2,6,6-tetramethylpiperidine derivative starting product belonging to component f) can be represented, for example, by a compound of the formula VIII-1, VIII-2 or VIII-3. It can also be present as a mixture of these three compounds.

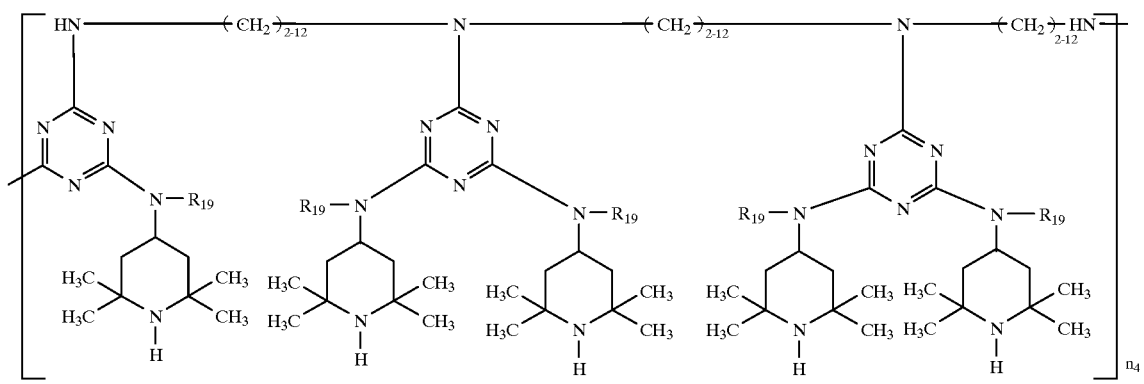

(VIII-1)

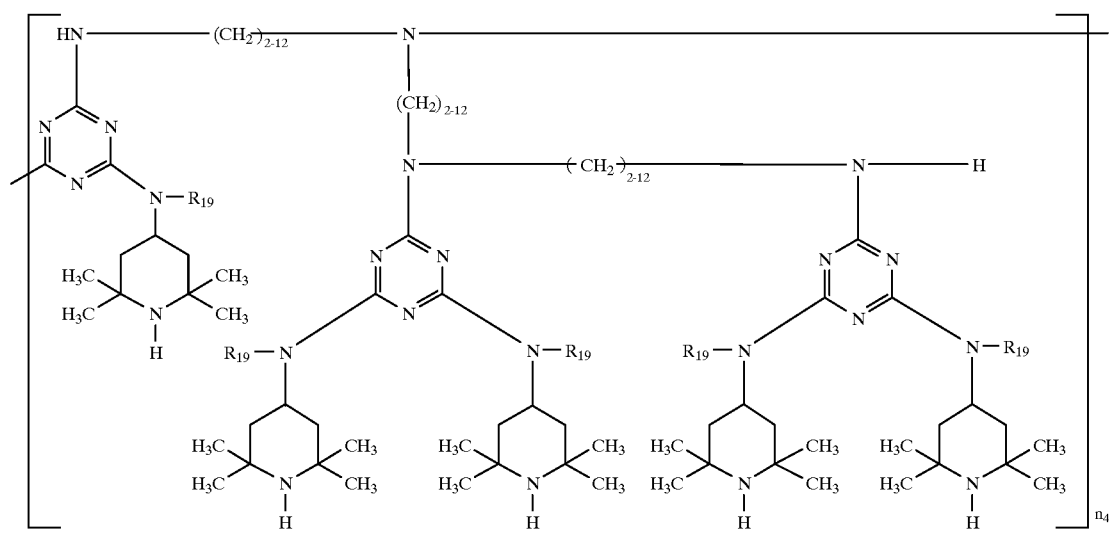

(VIII-2)

(VIII-3)
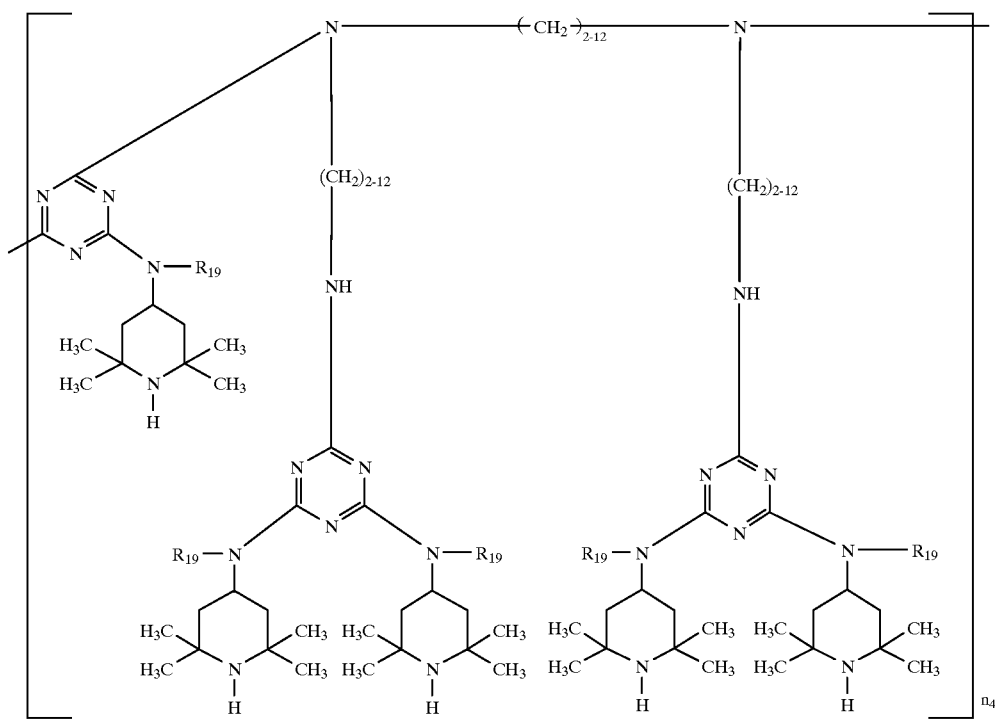
A preferred meaning of the formula VIII-1 is
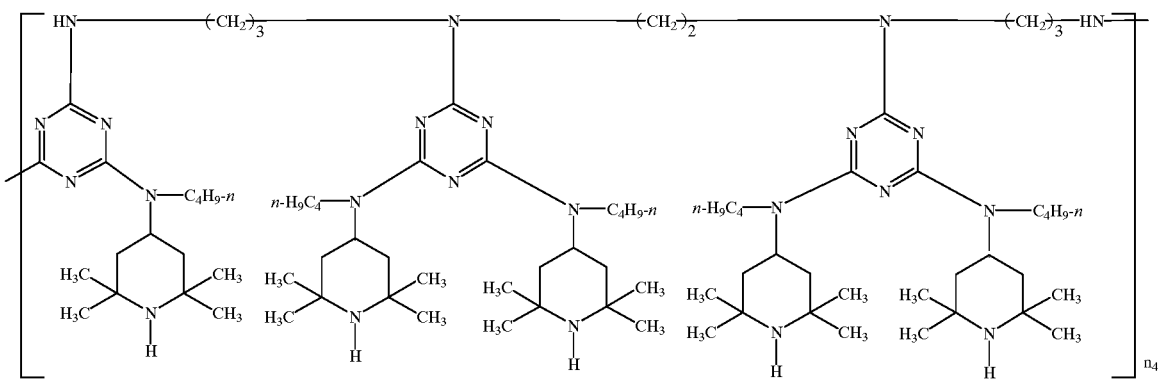

A preferred meaning of the formula VIII-2 is

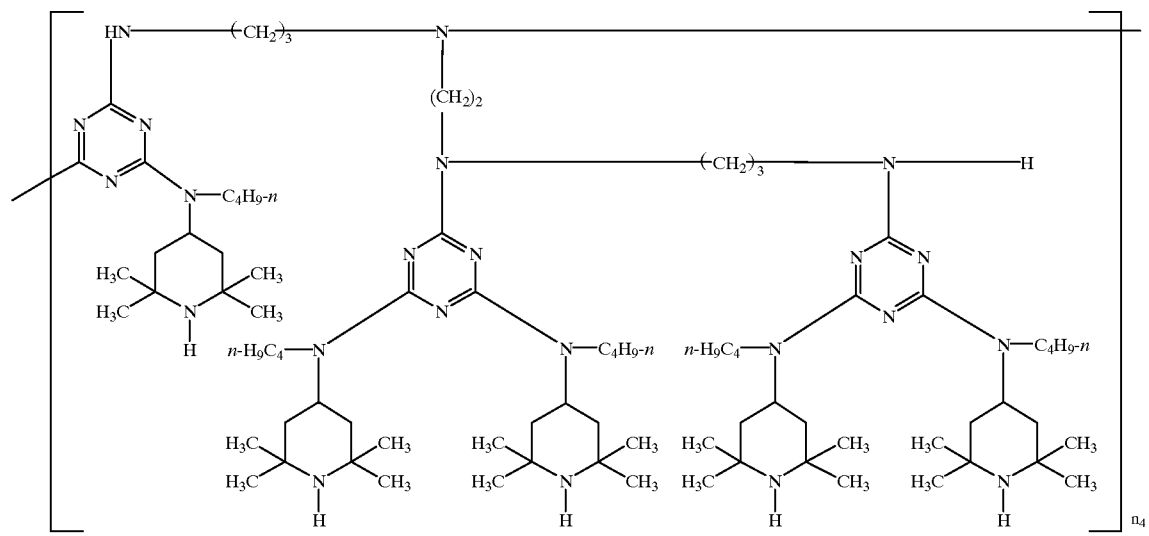

A preferred meaning of the formula VIII-3 is

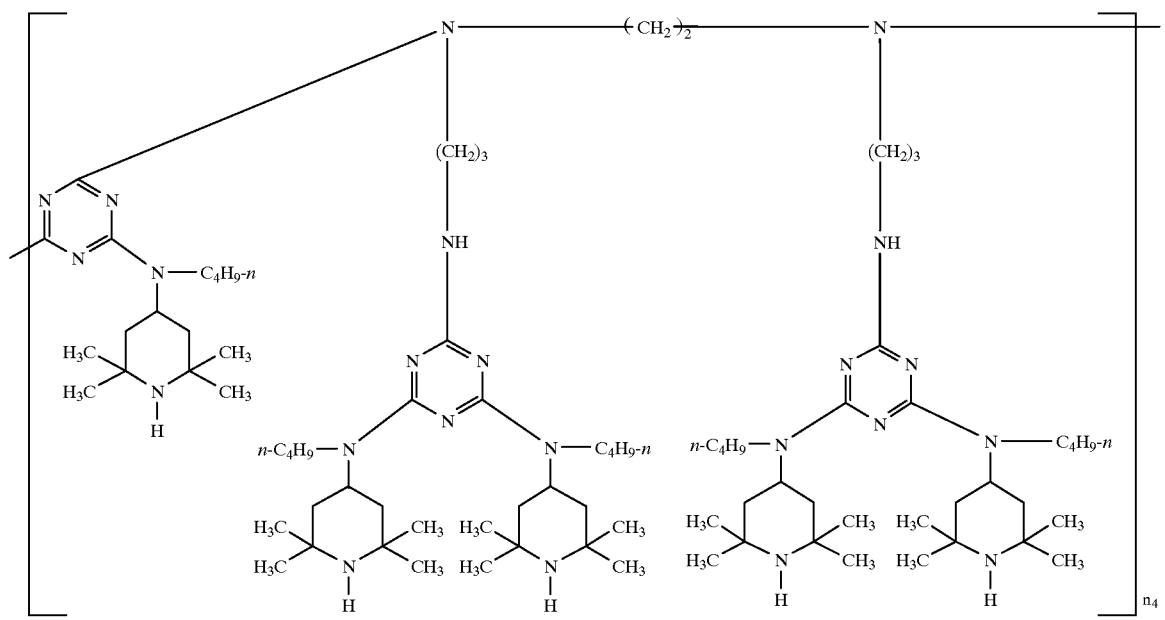

In the above formulae VIII-1 to VIII-3, $n_4$ is preferably from 1 to 20.

Example of a preparation process

The compounds described as components a) to l) can be prepared from the abovementioned 2,2,6,6-tetramethylpiperidine derivative starting products in analogy to known methods, for example as disclosed in U.S. Pat. No. 5,204,473, by oxidizing the corresponding 2,2,6,6-tetramethylpiperidine derivative with an appropriate peroxy compound, such as hydrogen peroxide or tert-butyl hydroperoxide, in the presence of a metal carbonyl catalyst or metal oxide catalyst, followed by reduction of the oxyl intermediate formed to give the desired N-hydroxy derivative, preferably by catalytic hydrogenation.

After this, the O-alkyl derivatives can be synthesized in various ways. For example, the N-hydroxy derivative can be alkylated using sodium hydride and halogenated hydrocarbons, such as ethyl iodide. N-methoxy variants can be prepared by thermolysis of a chlorobenzene solution of the nitroxyl radical and di-tert-butyl peroxide. The product is formed by a coupling reaction between the nitroxyl radical and the methyl radical, which is produced by the β-cleavage of a tert-butoxy radical.

Other N-alkoxy variants can be synthesized by coupling nitroxyl radicals with hydrocarbon radicals which are formed in the course of the thermal decomposition of di-tert-butyl peroxide in the presence of hydrocarbon solvents, such as cyclohexane, toluene and ethylbenzene.

Although these procedures have been described in the context of N-alkoxy substituents, it is understood that they can be applied equally to all groups $OR_1$.

For example, 1-cycloalkyloxy-2,2,6,6-tetramethyl-4-piperidyl derivatives can be prepared by reacting the corresponding 2,2,6,6-tetramethyl-4-piperidyl derivative with tert-butyl hydroperoxide in the presence of $MoO_3$ and a cycloalkane.

In general, component f) can also be represented, for example, by a compound of the formula VIII-1, VIII-2 or VIII-3, the hydrogens on the nitrogen atoms of the 2,2,6,6-tetramethyl-4-piperidyl radicals being replaced by groups —$OR_{20}$. It can also be present as a mixture of these three compounds.

The product described as component f), for example, is also obtainable by reacting a product, obtained by reaction between a polyamine of the formula VIIIa and cyanuric chloride, with a compound of the formula VIIId

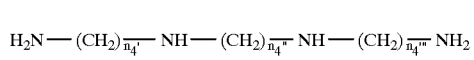

(VIIIa)

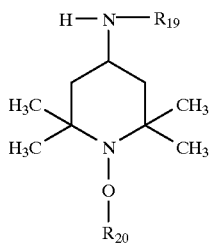

(VIIId)

in which
$n_4'$, $n_4''$ and $n_4'''$ independently of one another are a number from 2 to 12,
$R_{19}$ is hydrogen, $C_1$–$C_{12}$alkyl, $C_5$–$C_{12}$cycloalkyl, phenyl or $C_7$–$C_9$phenylalkyl, and
$R_{20}$ is as defined for $R_1$.

The reaction can take place, for example, in analogy to the preparation process described in U.S. Pat. No. 4,477,615.

As component a), ®TINUVIN 123 is employed with particular preference. Preferred starting products are also, for the preparation of a compound of component a), ®MARK LA 57 or ®DASTIB 845, for the preparation of a compound of component b) a precursor of ®CHIMASSORB 119 (unsubstituted nitrogen in the 2,2,6,6-tetramethyl-4-piperidyl groups), for the preparation of a compound of component d) ®CHIMASSORB 944, ®CYASORB UV 3346 or ®DASTIB 1082, for the preparation of a compound of component e) ®UVASIL 299 or ®UVASIL 125, for the preparation of a compound of component f) ®UVASORB HA 88, for the preparation of a compound of component g) ®UVINUL 5050 H, ®LICHTSCHUTZSTOFF UV 31 or ®LUCHEM HA-B 18, for the preparation of a compound of component h) ®LICHTSCHUTZMITTEL S95, for the preparation of a compound of component i) ®HOSTAVIN N 30, for the preparation of a compound of component j) ®HOSTAVIN N20 or ®SANDUVOR 3050 and for the preparation of a compound of component k) ®MARK LA 68.

The definition of the terminal groups which saturate the free valences in the compounds of the formulae VI, VII, VIII-1, VIII-2, VIII-3, IX, XI and XIII depend on the processes used for their preparation. The terminal groups can also be modified after the preparation of the compounds.

If the compounds of the formula VI are prepared by reacting a compound of the formula

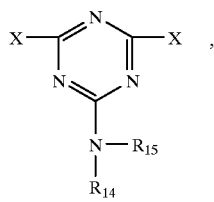

in which X is for example halogen, especially chlorine, and $R_{14}$ and $R_{15}$ are as defined above, with a compound of the formula

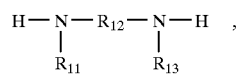

in which $R_{11}$, $R_{12}$ and $R_{13}$ are as defined above, then the terminal group bonded to the diamino radical is hydrogen or

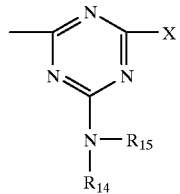

and the terminal group bonded to the triazine radical is X or

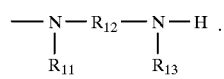

If X is a halogen it is advantageous to replace it, for example, by -OH or an amino group when the reaction is complete. Examples of amino groups which may be mentioned are pyrrolidin-1-yl, morpholino, —$NH_2$, —$N(C_1$–$C_8$alkyl$)_2$ and —$NR(C_1$–$C_8$alkyl), in which R is hydrogen or a group of the formula IV.

In the compounds of the formula VII, the terminal group bonded to the silicon atom can, for example, be $(R_{16})_3Si$—O— and the end group bonded to the oxygen atom can, for example, be —$Si(R_{16})_3$.

The compounds of the formula VII can also exist as cyclic compounds if $n_3$ is a number from 3 to 10; in other words, the free valences depicted in the structural formulae in that case form a direct bond.

In the compounds of the formula VIII-1, VIII-2 and VIII-3 the terminal group bonded to the triazine radical is, for example, Cl or a group

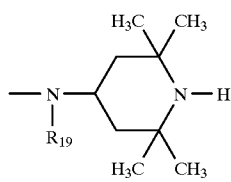

and the terminal group bonded to the amino radical is, for example, hydrogen or a group

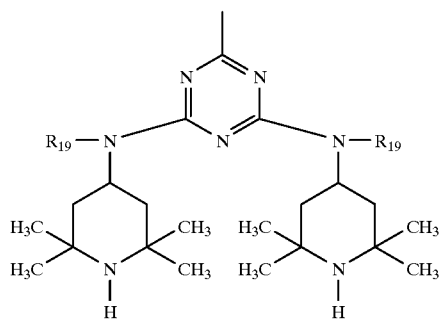

In the compounds of the formula IX the terminal group bonded to the 2,5-dioxopyrrolidine ring is, for example, hydrogen and the terminal group bonded to the radical —C($R_{27}$)($R_{28}$)— is, for example,

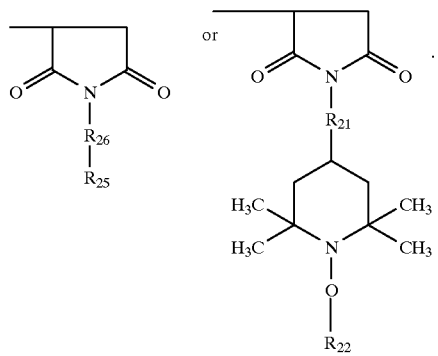

In the compounds of the formula XI the terminal group bonded to the dimethylene radical can, for example, be —OH and the terminal group bonded to the oxygen can, for example, be hydrogen. The terminal groups can also be polyether radicals.

In the compounds of the formula XIII the terminal group bonded to the carbonyl radical is, for example,

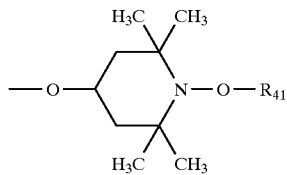

and the terminal group bonded to the oxygen radical is, for example,

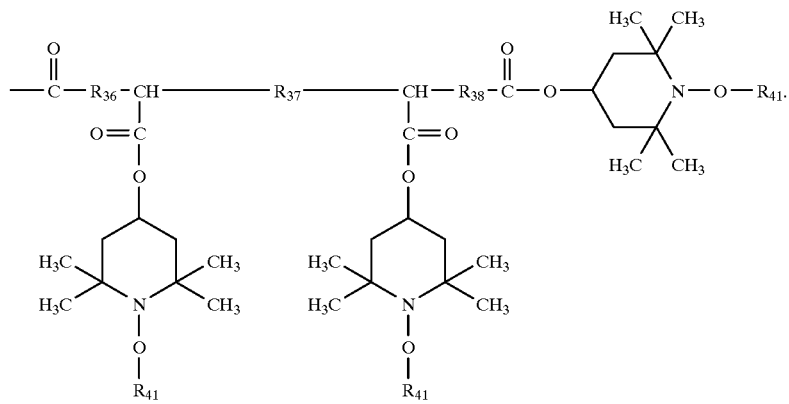

A preferred stabilizer mixture is one in which $R_1$, $R_9$, $R_{10}$, $R_{18}$, $R_{20}$, $R_{22}$, $R_{30}$, $R_{31}$, $R_{35}$ and $R_{41}$ independently of one another are $C_1$–$C_{12}$alkyl, $C_5$–$C_8$cycloalkyl or methyl-substituted $C_5$–$C_8$cycloalkyl.

Preference is likewise given to a stabilizer mixture in which $R_1$, $R_9$, $R_{10}$, $R_{18}$, $R_{20}$, $R_{22}$, $R_{30}$, $R_{31}$, $R_{35}$ and $R_{41}$ independently of one another are methyl, octyl or cyclohexyl.

The following stabilizer mixtures may be mentioned as examples:

1. Stabilizer mixture comprising at least one compound of component a) and at least one compound of component b), c), d), e), f), g), h), i), j), k) or l),
2. Stabilizer mixture comprising at least one compound of component b) and at least one compound of component c), d), e), f), g), h), i), j), k) or l),
3. Stabilizer mixture comprising at least one compound of component c) and at least one compound of component d), e), f), g), h), i), j), k) or l),
4. Stabilizer mixture comprising at least one compound of component d) and at least one compound of component e), f), g), h), i), j), k) or l),
5. Stabilizer mixture comprising at least one compound of component e) and at least one compound of component f), g), h), i), j), k) or l),
6. Stabilizer mixture comprising at least one compound of component f) and at least one compound of component g), h), i), j), k) or l),
7. Stabilizer mixture comprising at least one compound of component g) and at least one compound of component h), i), j), k) or l),
8. Stabilizer mixture comprising at least one compound of component h) and at least one compound of component i), j), k) or l),
9. Stabilizer mixture comprising at least one compound of component i) and at least one compound of component j), k) or l),
10. Stabilizer mixture comprising at least one compound of component j) and at least one compound of component k) or l),
11. Stabilizer mixture comprising at least one compound of component k) and at least one compound of component l),
12. Stabilizer mixture comprising at least two different compounds of component a),
13. Stabilizer mixture comprising at least two different compounds of component b),
14. Stabilizer mixture comprising at least two different compounds of component c),
15. Stabilizer mixture comprising at least two different compounds of component d),
16. Stabilizer mixture comprising at least two different compounds of component e),
17. Stabilizer mixture comprising at least two different compounds of component f),
18. Stabilizer mixture comprising at least two different compounds of component g),
19. Stabilizer mixture comprising at least two different compounds of component h),
20. Stabilizer mixture comprising at least two different compounds of component i),
21. Stabilizer mixture comprising at least two different compounds of component j),
22. Stabilizer mixture comprising at least two different compounds of component k),
23. Stabilizer mixture comprising at least two different compounds of component l).

The following stabilizer mixtures are preferred:

A. Stabilizer mixture comprising at least one compound of component a) and at least one compound of component b), c), d), e), f), g), h), i), j), k) or l), B. Stabilizer mixture comprising at least one compound of component a) and at least one compound of component b), c), d), e), f), g), h) or j), C. Stabilizer mixture comprising at least one compound of component b) and at least one compound of component d), e), f), g) or k) and D. Stabilizer mixture comprising at least one compound of component c) and at least one compound of component a), b), d), e), f), g), h) or j).

Also preferred is a stabilizer mixture in which $n_1$ is 1, 2 or 4, if $n_1$ is 1, $R_2$ is $C_{10}$–$C_{20}$alkyl, if $n_1$ is 2, $R_2$ is $C_6$–$C_{10}$alkylene, and if $n_1$ is 4, $R_2$ is butanetetrayl;

$R_3$ and $R_7$ independently of one another are hydrogen or $C_1$–$C_4$alkyl, $R_4$, $R_5$ and $R_6$ independently of one another are $C_2$–$C_6$alkylene, $R_8$ is hydrogen, $C_1$–$C_6$alkyl, $C_5$–$C_9$cycloalkyl, methyl-substituted $C_5$–$C_8$cycloalkyl, phenyl, $C_7$–$C_9$phenylalkyl or a group of the formula IV;

$R_{11}$, $R_{13}$, $R_{14}$ and $R_{15}$ independently of one another are hydrogen, $C_1$–$C_9$alkyl, $C_5$–$C_8$cycloalkyl, methyl-substituted $C_5$–$C_8$cycloalkyl, phenyl, $C_7$–$C_9$phenylalkyl or a group of the formula IV, or the radicals $R_{14}$ and $R_{15}$, together with the nitrogen atom to which they are attached, form a 6-membered heterocyclic ring, $R_{12}$ is $C_2$–$C_{10}$alkylene, and $n_2$ is a number from 2 to 25;

$R_{16}$ is $C_1$–$C_4$alkyl, $C_5$–$C_8$cycloalkyl or phenyl, $R_{17}$ is $C_3$–$C_6$alkylene, and $n_3$ is a number from 1 to 25;

$n_4'$, $n_4''$ and $n_4'''$ independently of one another are a number from 2 to 4, and $R_{19}$ is $C_1$–$C_4$alkyl;

$R_{21}$ and $R_{26}$ independently of one another are a direct bond or a group —N($Y_1$)—CO—$Y_2$—CO—N($Y_3$)—, $Y_1$ and $Y_3$ independently of one another are hydrogen or $C_1$–$C_4$alkyl, $Y_2$ is a direct bond, $R_{23}$ and $R_{27}$ are $C_1$–$C_{25}$alkyl or phenyl, $R_{24}$ and $R_{28}$ are hydrogen or $C_1$–$C_4$alkyl, $R_{25}$ is $C_1$–$C_{25}$alkyl or a group of the formula IV, and $n_5$ is a number from 1 to 25;

$R_{29}$ is $C_8$–$C_{15}$alkyl;

$n_6$ is a number from 2 to 25;

$R_{32}$ and $R_{33}$ together form $C_8$–$C_{14}$alkylene, $R_{34}$ is hydrogen or a group —$Z_1$—COO—$Z_2$, $Z_1$ is $C_2$–$C_6$alkylene and $Z_2$ is $C_8$–$C_{15}$alkyl;

$R_{36}$, $R_{38}$, $R_{39}$ and $R_{40}$ independently of one another are $C_1$–$C_4$alkylene, $R_{37}$ is a direct bond, and $n_7$ is a number from 1 to 25.

A particularly preferred stabilizer mixture is one in which component a) is at least one compound of the formula a-I-1, a-I-2 or a-I-3,
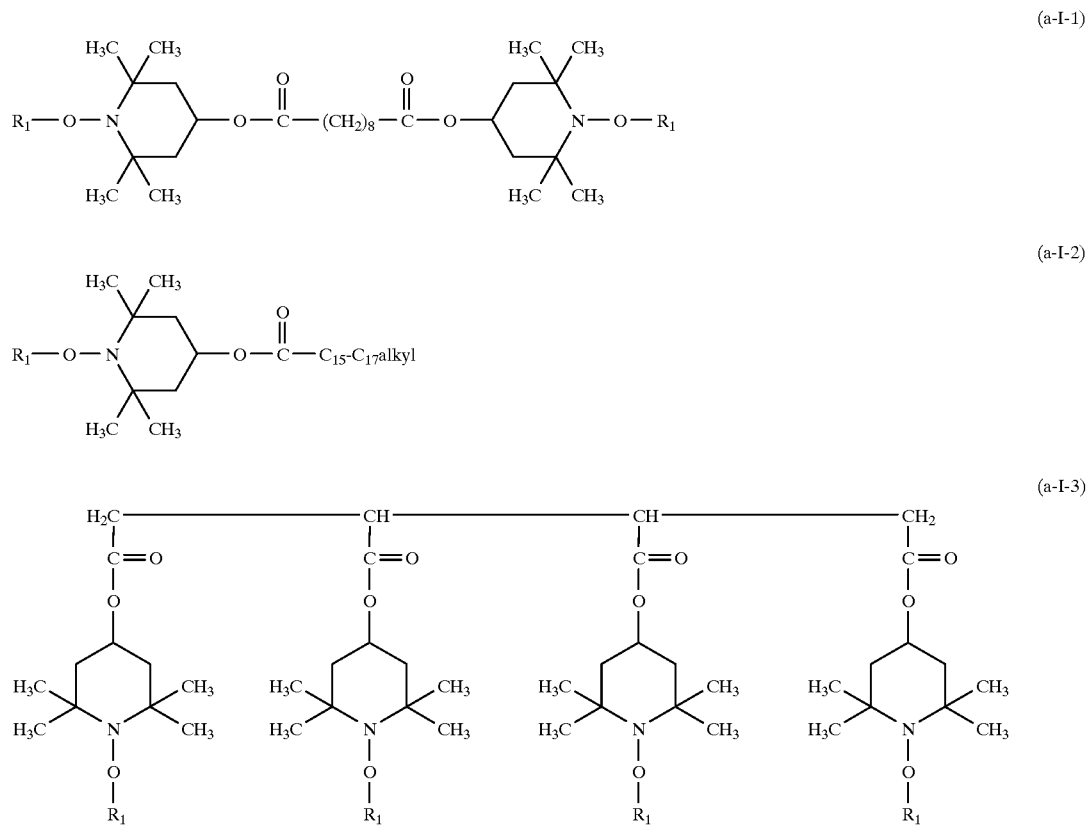
in which $R_1$ is methyl, octyl or cyclohexyl;
component b) is at least one compound of the formula b-II,
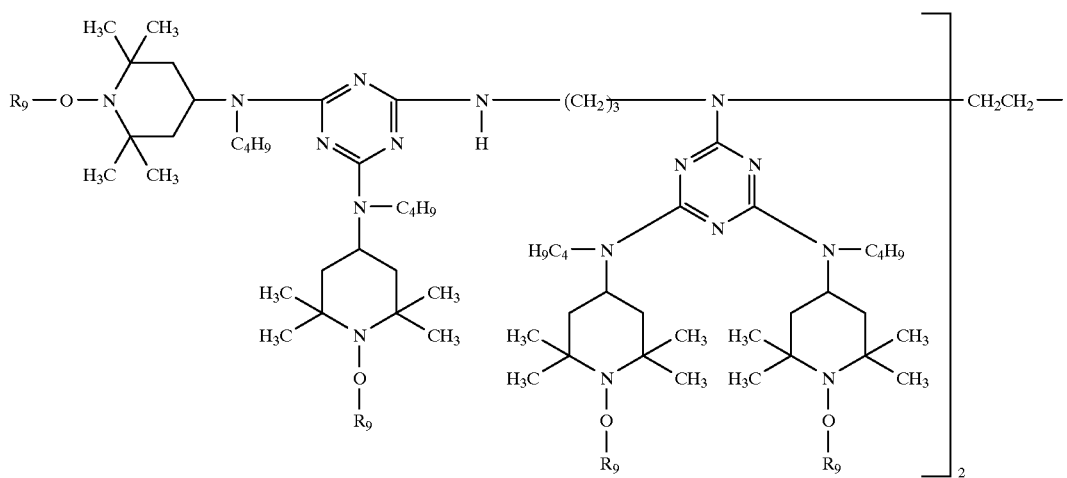

in which $R_9$ is as defined for $R_1$;
component c) is at least one compound of the formula c-V,
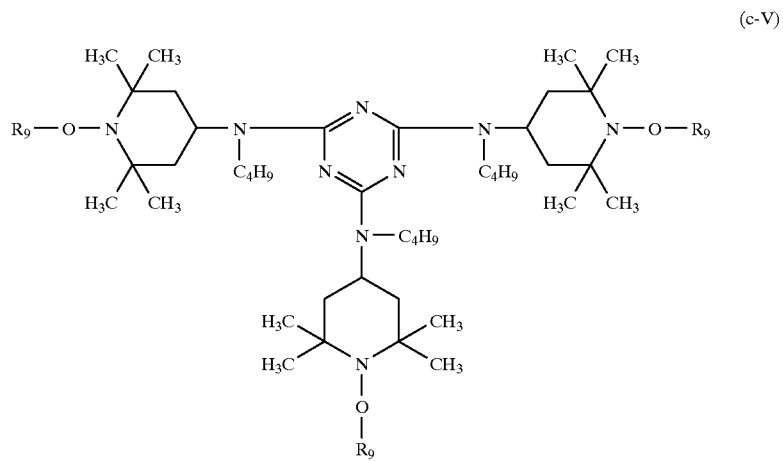
(c-V)
in which $R_9$ is as defined above;
component d) is at least one compound of the formula d-VI-1, d-VI-2 or d-VI-3,
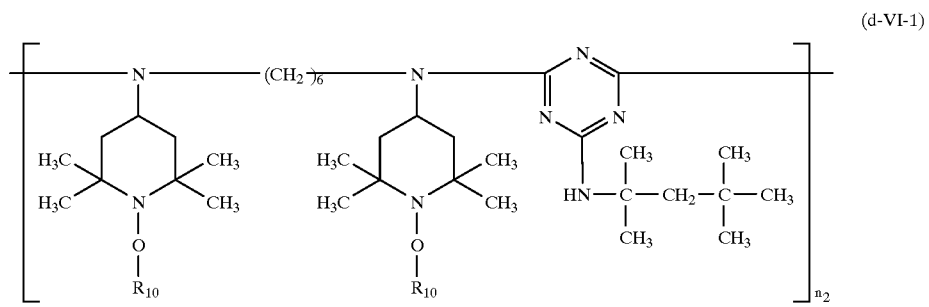
(d-VI-1)
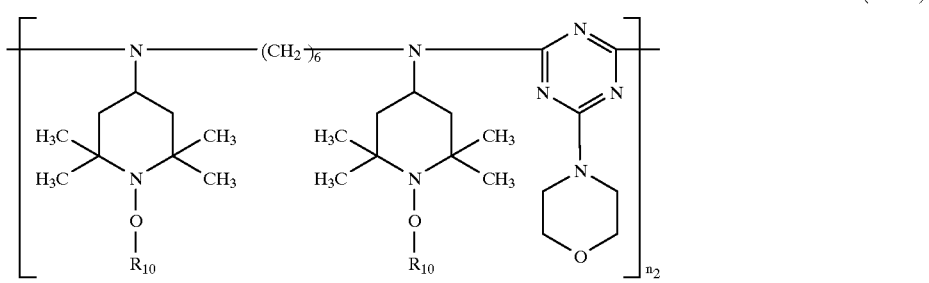
(d-VI-2)
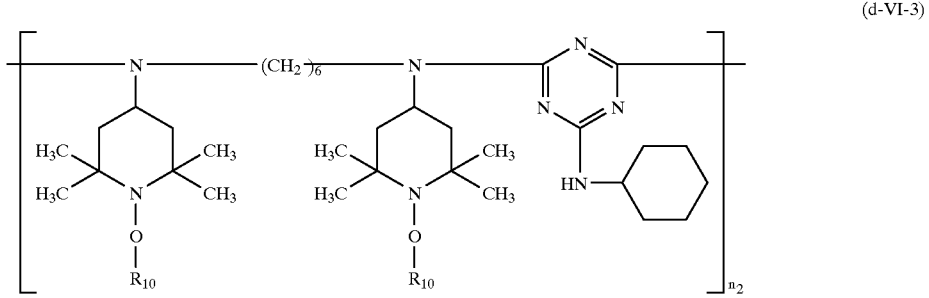
(d-VI-3)

in which $R_{10}$ is as defined for $R_1$ and $n_2$ is a number from 2 to 25;

component e) is at least one compound of the formula e-VII,

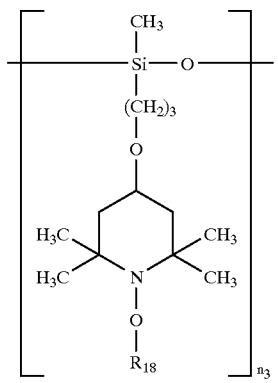
(e-VII)

in which $R_{18}$ is as defined for $R_1$ and $n_3$ is a number from 1 to 25;

component f) is a product obtainable by reacting a product, obtained by reaction between a polyamine of the formula

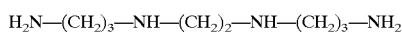

and cyanuric chloride, with a compound of the formula

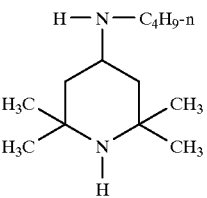

to form a triazine derivative which contains 2,2,6,6-tetramethyl-4-piperidyl groups, and then reacting the 2,2,6,6-tetramethyl-4-piperidyl groups present in the triazine derivative to form groups of the formula

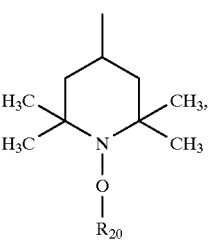

in which $R_{20}$ is as defined for $R_1$;

component g) is at least one compound of the formula g-IX-1, g-IX-2 or g-IX-3,

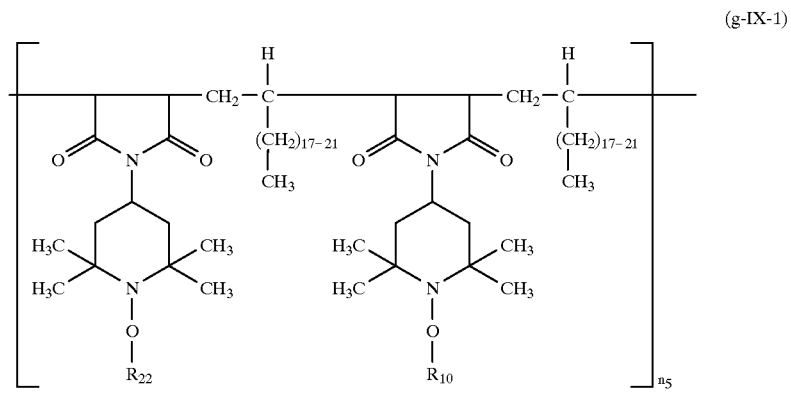
(g-IX-1)

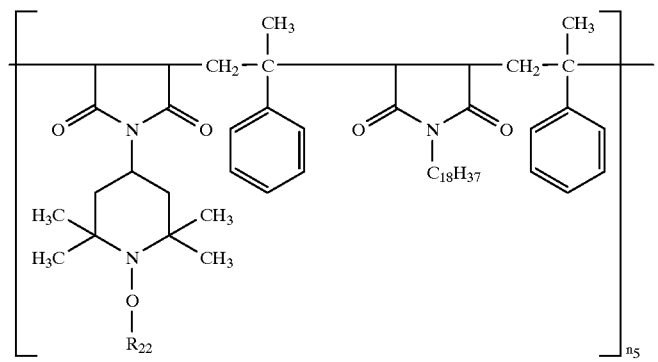
(g-IX-2)

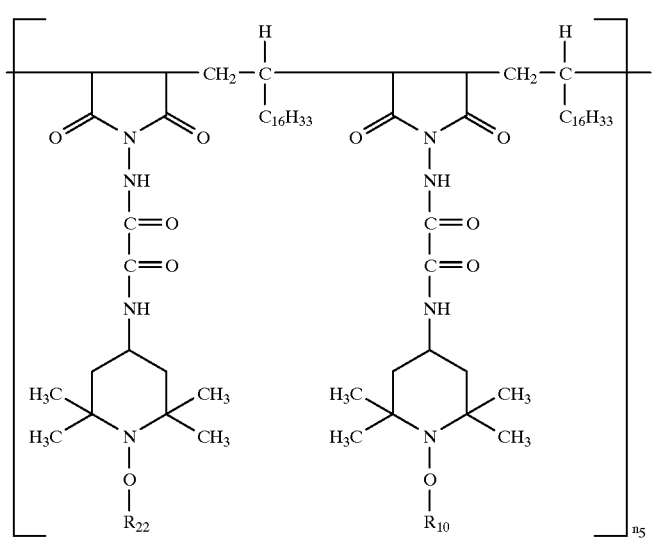

(g-IX-3)

in which $R_{10}$ and $R_{22}$ are as defined for $R_1$ and $n_5$ is a number from 1 to 25;

component h) is at least one compound of the formula h-X

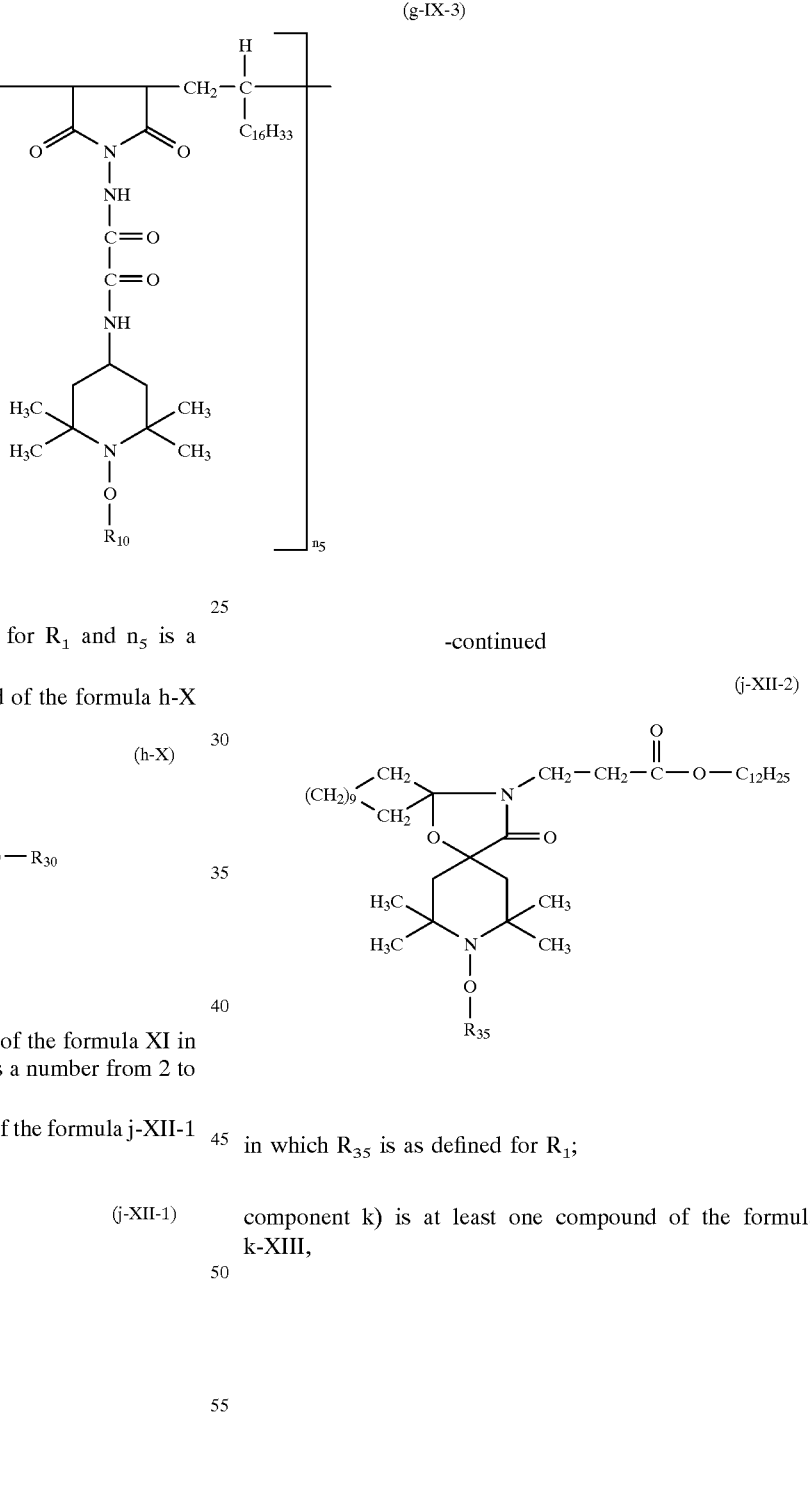

in which $R_{30}$ is as defined for $R_1$;

component i) is at least one compound of the formula XI in which $R_{31}$ is as defined for $R_1$ and $n_6$ is a number from 2 to 25;

component j) is at least one compound of the formula j-XII-1 or j-XII-2, in which $R_{35}$ is as defined for $R_1$;

component k) is at least one compound of the formula k-XIII,

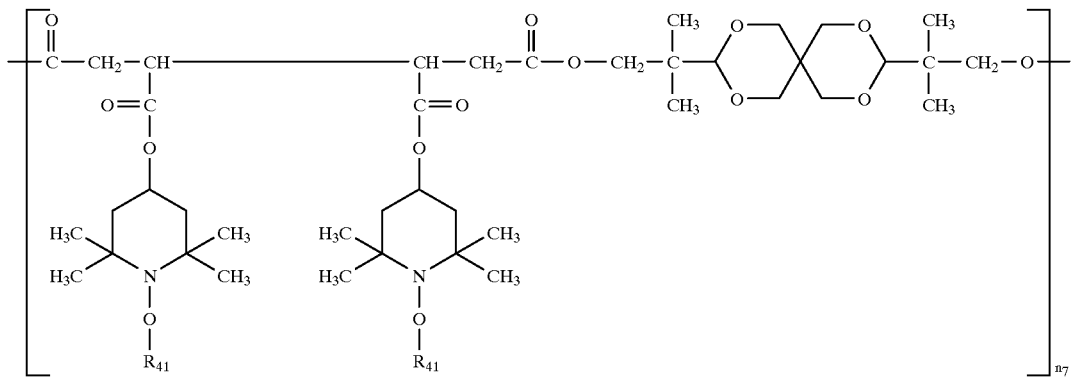
(k-XIII)

in which $R_{41}$ is as defined for $R_1$ and $n_7$ is a number from 1 to 25;

component l) is at least one compound of the formula l-XIV,

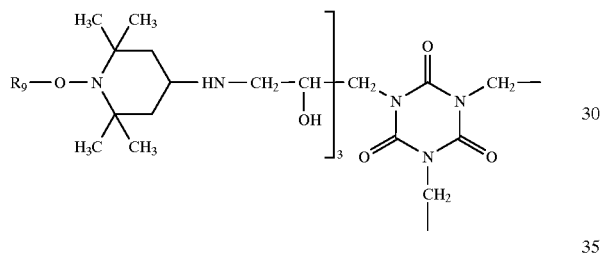
(l-XIV)

in which $R_9$ is as defined for $R_1$.

The following stabilizer systems are of particular interest:

a-1) Stabilizer mixture comprising at least one compound of the formula a-I-1 and at least one compound of the formula d-VI-1 in which $R_1$ and $R_{10}$ independently of one another are, for example, methyl, octyl or cyclohexyl and $R_1$ is preferably octyl, a-2) Stabilizer mixture comprising at least one compound of the formula a-I-1 and at least one compound of the formula b-II in which $R_1$ and $R_9$ independently of one another are, for example, methyl, octyl or cyclohexyl and $R_1$ is preferably octyl, and $R_9$ is preferably cyclohexyl, a-3) Stabilizer mixture comprising at least one compound of the formula a-I-1 and at least one compound characterized by component f), where $R_1$ and $R_{20}$ independently of one another are, for example, methyl, octyl or cyclohexyl and $R_1$ is preferably octyl, a-4) Stabilizer mixture comprising at least one compound of the formula a-I-1 and at least one compound of the formula d-VI-2 in which $R_1$ and $R_{10}$ independently of one another are, for example, methyl, octyl or cyclohexyl and $R_1$ is preferably octyl, a-5) Stabilizer mixture comprising at least one compound of the formula a-I-1 and at least one compound of the formula c-V in which $R_1$ and $R_9$ independently of one another are, for example, methyl, octyl or cyclohexyl and $R_1$ is preferably octyl and $R_9$ is preferably methyl or cyclohexyl, a-6) Stabilizer mixture comprising at least one compound of the formula a-I-1 and at least one compound of the formula e-VII in which $R_1$ and $R_{18}$ independently of one another are, for example, methyl, octyl or cyclohexyl and $R_1$ is preferably octyl, a-7) Stabilizer mixture comprising at least one compound of the formula a-I-1 and at least one compound of the formula g-IX-1 in which $R_1$ and $R_{22}$ independently of one another are, for example, methyl, octyl or cyclohexyl and $R_1$ is preferably octyl, b-1) Stabilizer mixture comprising at least one compound of the formula c-V and at least one compound of the formula d-VI-1 in which $R_9$ and $R_{10}$ independently of one another are, for example, methyl, octyl or cyclohexyl and $R_9$ is preferably methyl or cyclohexyl, b-2) Stabilizer mixture comprising at least one compound of the formula c-V and at least one compound of the formula b-II in which $R_9$ is, for example, methyl, octyl or cyclohexyl and in the formula c-V is preferably methyl or cyclohexyl and in the formula b-II is preferably cyclohexyl, b-3) Stabilizer mixture comprising at least one compound of the formula c-V and at least one compound characterized by component f), in which $R_9$ and $R_{20}$ independently of one another are, for example, methyl, octyl or cyclohexyl and $R_9$ is preferably methyl or cyclohexyl, b-4) Stabilizer mixture comprising at least one compound of the formula c-V and at least one compound of the formula d-VI-2 in which $R_9$ and $R_{10}$ independently of one another are, for example, methyl, octyl or cyclohexyl and $R_9$ is preferably methyl or cyclohexyl, b-5) Stabilizer mixture comprising at least one compound of the formula c-V and at least one compound of the formula e-VII in which $R_9$ and $R_{18}$ independently of one another are, for example, methyl, octyl or cyclohexyl and $R_9$ is preferably methyl or cyclohexyl, b-6) Stabilizer mixture comprising at least one compound of the formula c-V and at least one compound of the formula g-IX-1 in which $R_9$ and $R_{22}$ independently of one another are, for example, methyl, octyl or cyclohexyl and $R_9$ is preferably methyl or cyclohexyl, c-1) Stabilizer mixture comprising at least one compound of the formula b-II and at least one compound of the formula a-I-3 in which $R_1$ and $R_9$ independently of one another are, for example, methyl, octyl or cyclohexyl and $R_9$ is preferably cyclohexyl, c-2) Stabilizer mixture comprising at least one compound of the formula b-II and at least one compound of the formula j-XII-1 in which $R_9$ and $R_{35}$ independently of one another are, for example, methyl, octyl or cyclohexyl and $R_9$ is preferably cyclohexyl, c-3) Stabilizer mixture comprising at least one compound of the formula b-II and at least one compound of the formula h-X in which $R_9$ and $R_{30}$ independently of one another are, for example, methyl, octyl or cyclohexyl and $R_9$ is preferably cyclohexyl, and c-4) Stabilizer mixture comprising at least one compound of the formula b-II and at least one compound of the formula a-I-2 in which $R_1$ and $R_9$ independently of one another are, for example, methyl, octyl or cyclohexyl and $R_9$ is preferably cyclohexyl.

In the abovementioned stabilizer systems the two compounds are particularly preferably present in a weight ratio of from 1:4 to 4:1.

The stabilizer mixture according to the invention is suitable for stabilizing organic materials against thermal, oxidative or light-induced degradation. Examples of such materials are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbomene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrenelbutadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrenelbutadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/ vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/ butadiene copolymers, acrylonitrile/alkyl acrylate copolymers, acrylonitrile/ alkoxyalkyl acrylate or acrylonitrile/vinyl halide copolymers or acrylonitrile/ alkyl methacrylate/ butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The invention therefore additionally relates to a composition comprising an organic material which is sensitive to oxidative, thermal or light-induced degradation and a stabilizer mixture according to the invention.

The organic material is preferably a synthetic polymer, especially one from the groups indicated above. Polyolefins are preferred, and particular preference is given to polyethylene, polypropylene and copolymers thereof.

The two compounds of the stabilizer system according to the invention can be added to the material to be stabilized individually or mixed with one another. In this context the overall quantity of the compounds can be from 0.01 to 5%, preferably from 0.05 to 3%, in particular from 0.05 to 2% or from 0.05 to 1%, based on the overall weight of the material to be stabilized.

The weight ratio of the two compounds is preferably from 10:1 to 1:10, for example from 1:5 to 5:1 or from 1:4 to 4:1.

The stabilizer mixture according to the invention or the individual compounds can be incorporated into the organic material by known methods, for example before or during shaping or by applying the dissolved or dispersed compounds to the organic material, if desired with subsequent evaporation of the solvent. The individual compounds of the stabilizer mixture according to the invention can be added to the material to be stabilized in the form of a powder, as granules or else as a masterbatch, which contains these components in a concentration, for example, of from 2.5 to 25% by weight.

If desired, the compounds of the stabilizer system according to the invention can be mixed with one another in the melt (melt blending) before incorporation.

The stabilizer system according to the invention or its compounds can be added before or during polymerization or prior to crosslinking.

The materials stabilized in this way can be employed in a wide variety of forms, for example as films, fibres, tapes, moulding compositions or profiles or as binders for coatings, adhesives or putties.

The stabilized organic materials of the invention can additionally comprise various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methyl-cyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2'-ethylidene-bis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis-[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tertbutyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-di-aminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- und dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R-CH$_2$CH$_2$-COO(CH$_2$)$_3$]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-di-phenylacrylate, methyl α-carbomethoxycinnamate, methyl α-cyano-β- methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl) sebacate, bis(1-octyloxy-2,2,6,6-tetramethylpiperidyl) succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl )-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis-(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl- 1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N- dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The weight ratio of stabilizer mixture according to the invention to the conventional additives can, for example, be from 1:0.5 to 1:5.

The invention also relates to the use of the stabilizer mixture according to the invention for stabilizing organic material against oxidative, thermal or light-induced degradation.

The organic materials stabilized by means of the stabilizer system according to the invention are distinguished not only by significantly improved light stability but also, in some cases, by improved thermal stability.

The examples which follow illustrate the invention in more detail. All percentages are by weight unless specified otherwise.

EXAMPLE A

Preparation of the compound of the formula

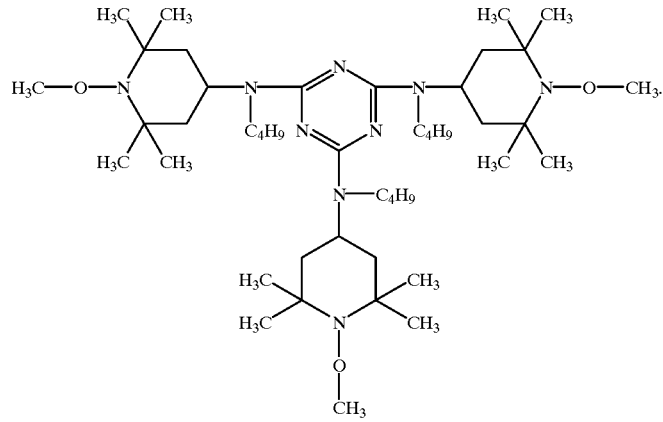

A solution of 23.6 g (0.098 mol) of 4-n-butylamino-1-methoxy-2,2,6,6-tetramethylpiperidine in 25 ml of xylene is added dropwise to a solution of 4.09 g (0.0217 mol) of cyanuric chloride in 50 ml of xylene and 6.2 g (0.098 mol) of KOH in powder form. The reaction mixture is heated at reflux for 23 hours. The solids are then removed by filtration and the filtrate is concentrated under reduced pressure. The crude product obtained is purified by crystallization (ethanol) to give 14.3 g (82% of theory) of the product indicated above as a white powder. The melting point is 151–153° C.

Elemental analysis for $C_{45}H_{87}N_9O_3$ Calculated: C, 67.4; H, 10.9; N, 15.7 Found: C, 67.4; H, 11.3; N, 15.7

EXAMPLE B

Preparation of the compound of the formula

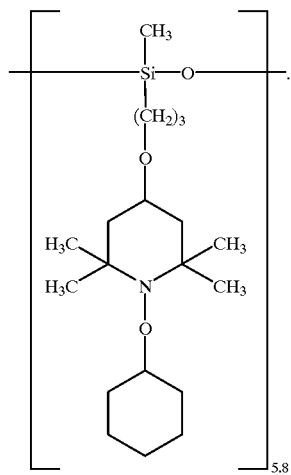

0.5 g of $MoO_3$ is added to a solution of 24.0 g of the compound of the formula

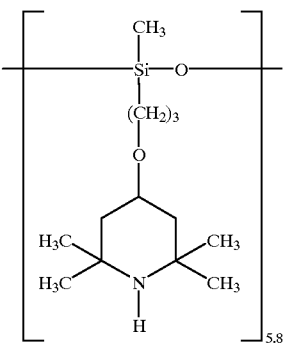

in 200 ml of cyclohexane. The solution is heated under reflux, and 20 ml of tert-butyl hydroperoxide (90%) are added over the course of 15 minutes. The reaction mixture is heated under reflux for 12 hours, then the catalyst is removed by filtration and a further 0.5 g of $MoO_3$ is added to the filtrate, followed by 20 ml of 90% tert-butyl hydroperoxide. After heating under reflux for 12 hours more, the red colour has disappeared. The reaction mixture is washed with 5% aqueous $Na_2SO_3$ solution until excess hydroperoxide is no longer present. The reaction solution is washed with water and salt solution, dried over $MgSO_4$ and evaporated to give 15 g of the compound indicated above as a clear viscous resin without crystals. The NMR and MS data agree with the structure indicated.

EXAMPLE C

Preparation of the compound of the formula

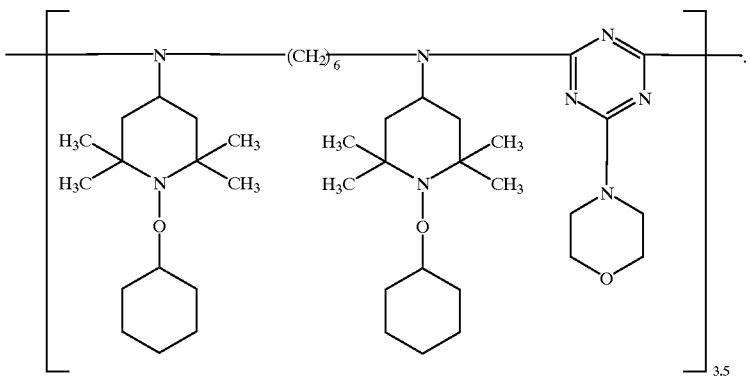

Preparation takes place in analogy to the process described in Example B, using 31.87 g of the compound of the formula

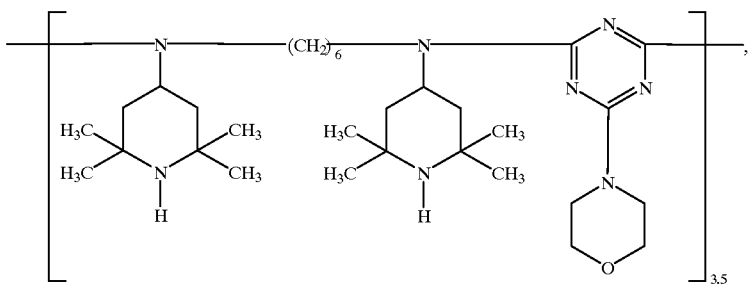

1.0 g of MoO$_3$ and 40 ml of 90% tert-butyl hydroperoxide in 600 ml of cyclohexane, to give 22.2 g of the compound indicated above as a white, vitreous solid. The melting point is 135° C. The NMR and MS data agree with the structure indicated.

EXAMPLE D

Preparation of the compound of the formula

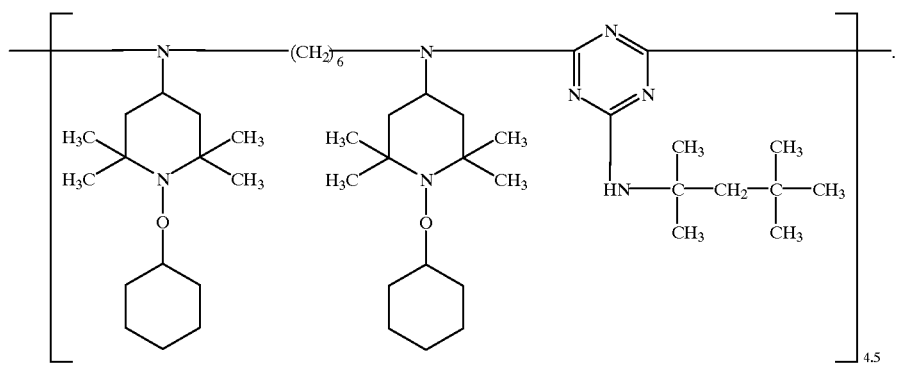

Preparation takes place in analogy to the process described in Example B, using 25.1 g of the compound of the formula

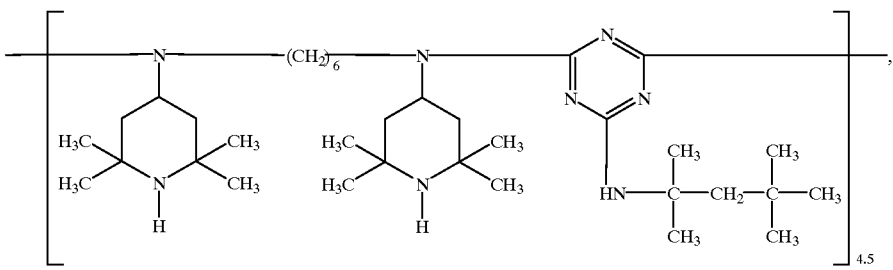

2.0 g of MoO$_3$ and 25 ml of 90% tert-butyl hydroperoxide in 500 ml of cyclohexane, to give 36.5 g of the compound indicated above as a pale yellow, vitreous solid. The melting point is 105–125° C. The NMR and MS data agree with the structure indicated.

EXAMPLE E

Preparation takes place in analogy to the process described in Example B, using 25.8 g of ®UVASORB HA 88 [a compound obtainable by reacting a product, obtained by reaction between a polyamine of the formula

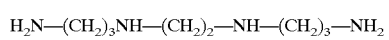

and cyanuric chloride, with a compound of the formula

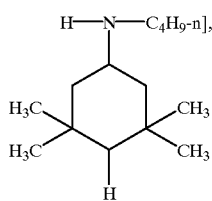

2.0 g of MoO₃ and 40 ml of 70% tert-butyl hydroperoxide in 500 ml of cyclohexane, to give 47.7 g of a corresponding compound which now contains, instead of 2,2,6,6-tetramethyl-4-piperidyl groups, 1-cyclohexyloxy-2,2,6,6-tetramethyl-4-piperidyl groups. The compound is present as a pale yellow resin with a few white crystals. The melting point is 135–145° C. Sintering occurs at 112° C. The NMR and MS data agree with the structure indicated.

EXAMPLE F

Preparation of the compound of the formula

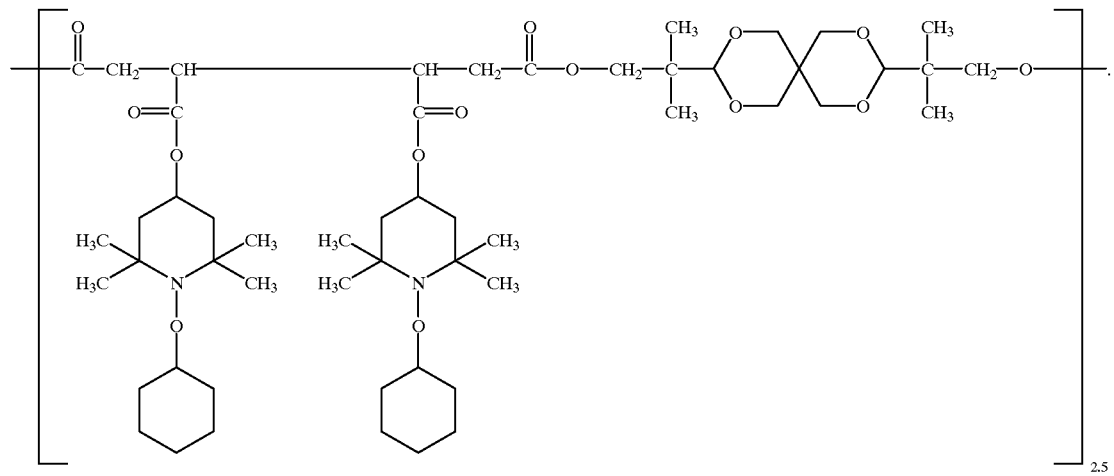

11.0 g (14.5 mmol based on the repeating unit) of the compound of the formula

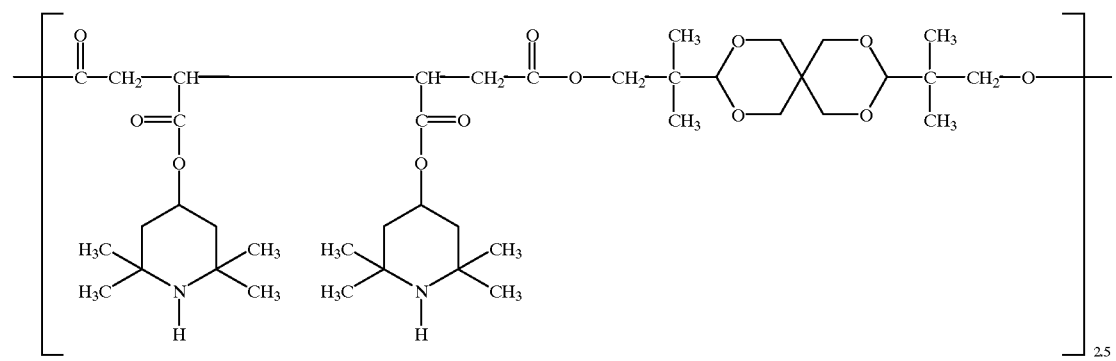

are dissolved in 200 ml of cyclohexane. 0.1 g of MoO₃ is added and the mixture is heated to reflux. 10 g (77.5 mmol) of a 70% (% by weight/weight) aqueous tert-butyl hydroperoxide solution are added slowly dropwise at 80° C. The water/tert-butanol mixture which forms during the reaction is distilled off azeotropically. The mixture is then heated at reflux for 14 hours, cooled to 20–30° C., added to powdered coal and filtered. The solution is washed twice with 10% (% by weight/weight) aqueous Na₂SO₃ and with water. The organic phase is dried over Na₂SO₄ and filtered and the filtrate is evaporated at 80° C./24 mbar. The residue obtained is a white powder with a melting point of 104–108° C. The NMR ($^1$H, $^{13}$C) analysis agrees with the structure indicated above.

EXAMPLE G

Preparation of the compound of the formula

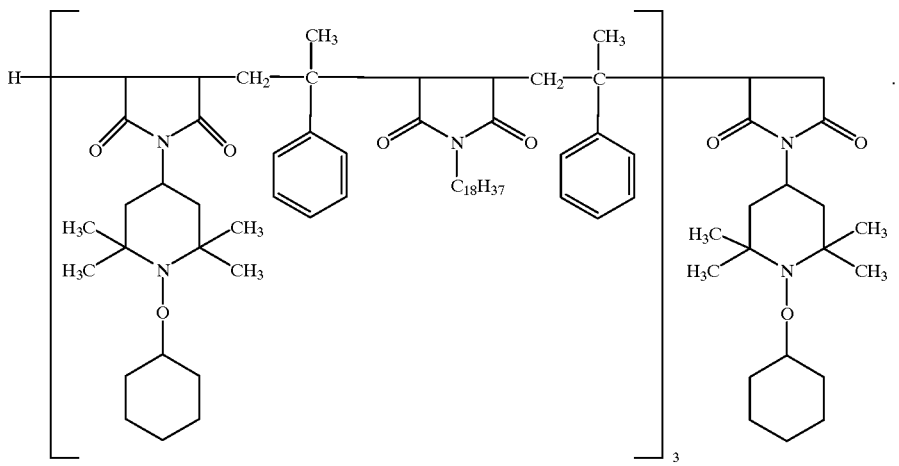

Preparation takes place in analogy to the process described in Example F. 11 g (10.3 mmol) based on the repeating unit) of the compound of the formula

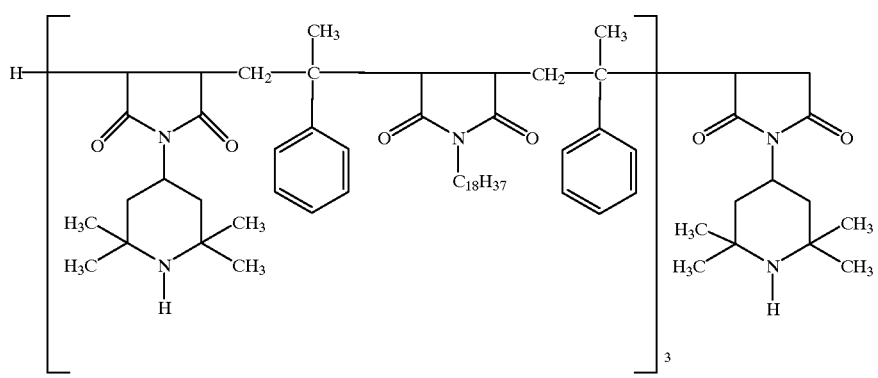

are reacted with 10 g of a 10% (% by weight/weight) tert-butyl hydroperoxide solution in cyclohexane in the presence of 0.1 g of $MoO_3$, to give, after evaporation, a white solid with a melting point of 135–139° C. NMR ($^1$H, $^{13}$C) analysis agrees with the structure indicated above.

EXAMPLE H

Preparation of the compound of the formula

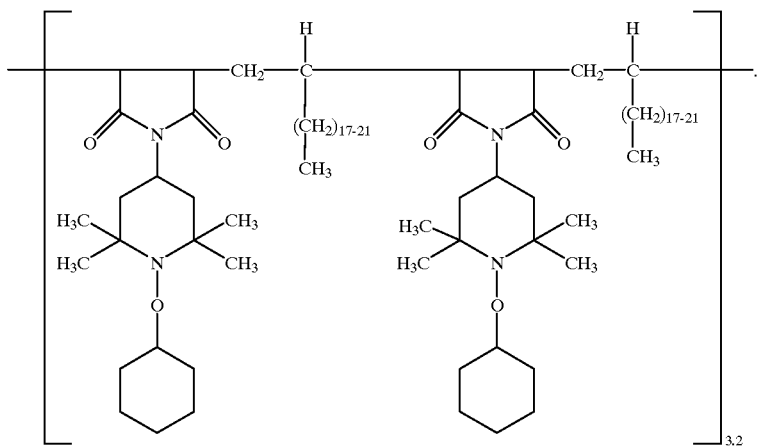

Preparation takes place in analogy to the process described in Example F. 19 g (30.8 mmol, based on the repeating unit) of the compound of the formula

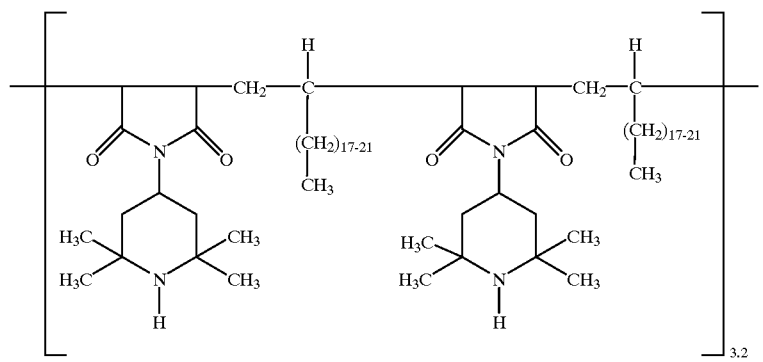

are reacted with 6.6 g of a 70% (% by weight/weight) aqueous tert-butyl hydroperoxide solution in cyclohexane in the presence of 0.5 g of $MoO_3$, giving, after evaporation, a yellow solid with a melting point of 80–87° C. The NMR ($^1H$, $^{13}C$) analysis agrees with the structure indicated above.

EXAMPLE I

Preparation of the compound of the formula

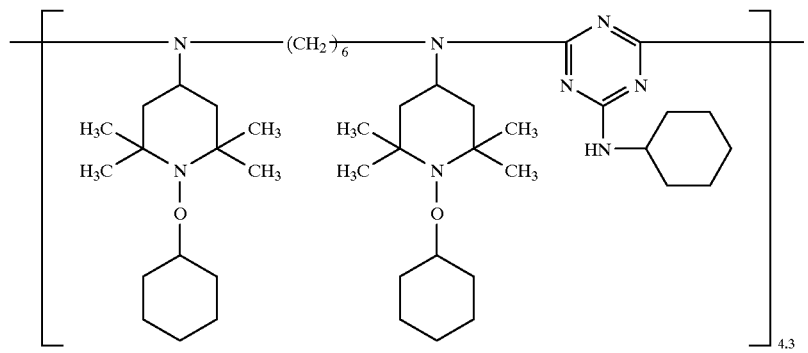

Preparation takes place in analogy to the process described in Example F. 30 g (39.2 mmol) based on the repeating unit) of the compound of the formula

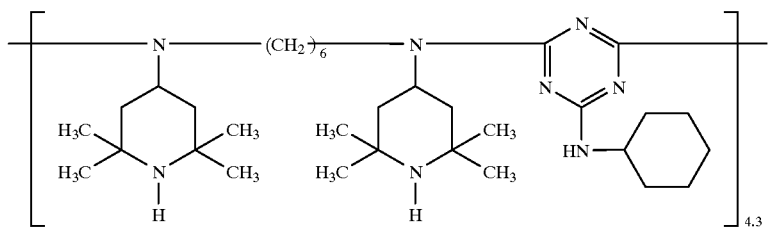

are reacted with 15.2 g of a 70% (% by weight/weight) aqueous tert-butyl hydroperoxide solution in cyclohexane in the presence of 0.8 g of $MoO_3$, to give, after evaporation, a yellow solid with a melting point of 72–77° C. The NMR ($^1H$, $^{13}C$) analysis agrees with the structure indicated above.

The light stabilizers used in Examples 1 to 3:
(The mean degree of polymerization is indicated in each case.)

Light stabilizer a-1 (US-A-5 204 473, Example 58):

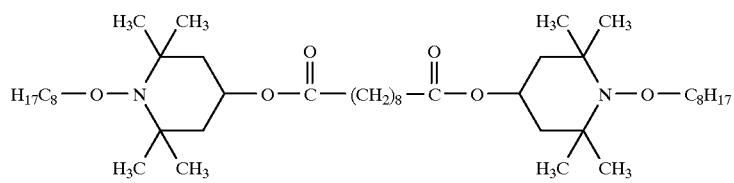

Light stabilizer a-2 (US-A-5 204 473, Example 4):

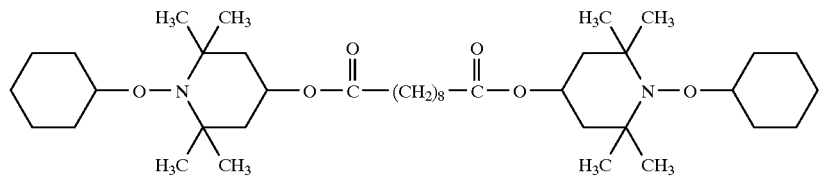

-continued
Light stabilizer b-1 (US-A-5 204 473, Example 62):
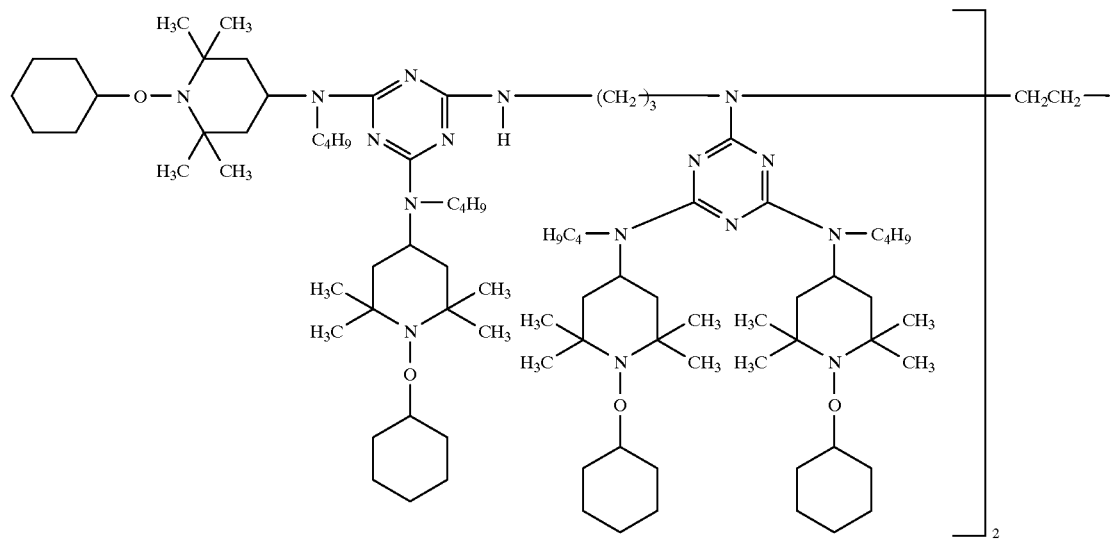
Light stabilizer c-1 (Example A):
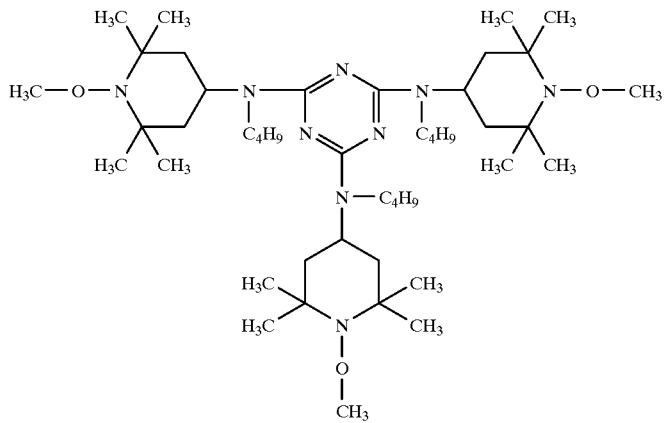
Light stabilizer c-2 (US-A-5 204 473, Example 63):
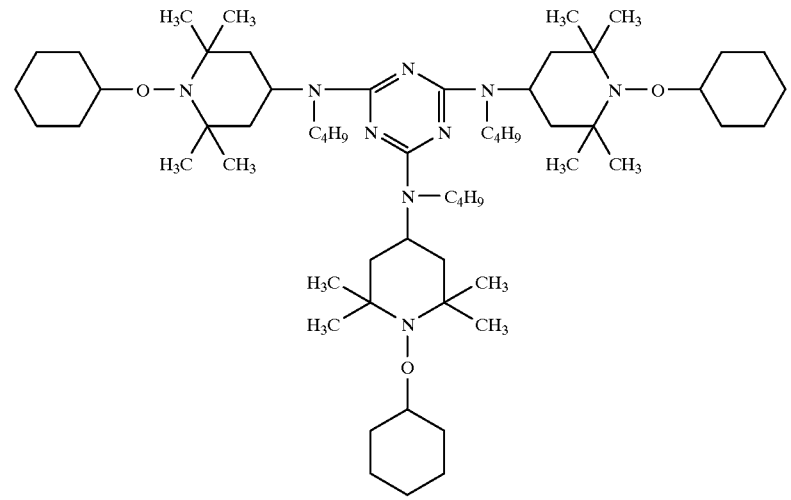

-continued
Light stabilizer d-1 (Example D):
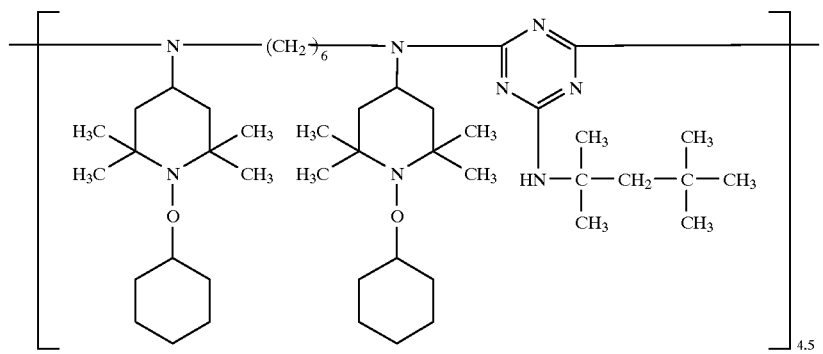
Light stabilizer d-2 (Example C):
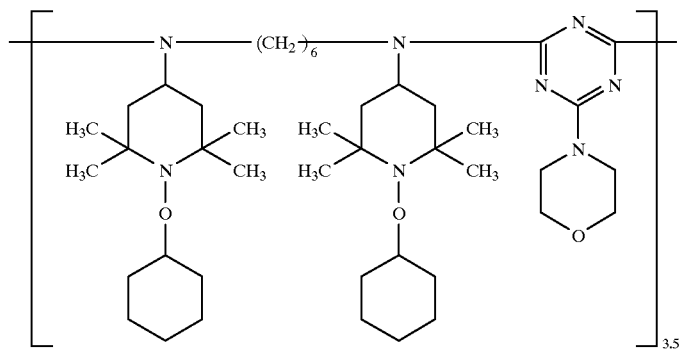
Light stabilizer e-1 (Example B):
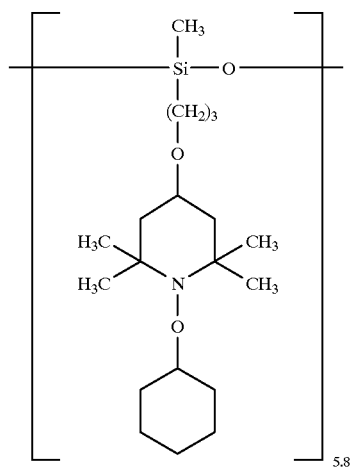
Light stabilizer f-1 (Example E):
®UVASORB HA 88 containing, instead of 2,2,6,6-tetramethyl-4-piperidyl groups,
1-cyclohexyloxy-2,2,6,6-tetramethyl-4-piperidyl groups.

Light stabilizer g-2 (Example G):

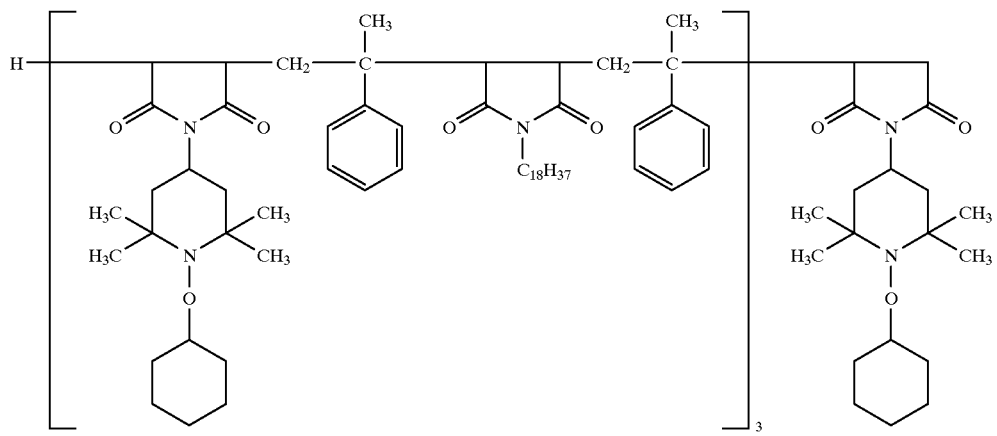

Light stabilizer k-1 (Example F):

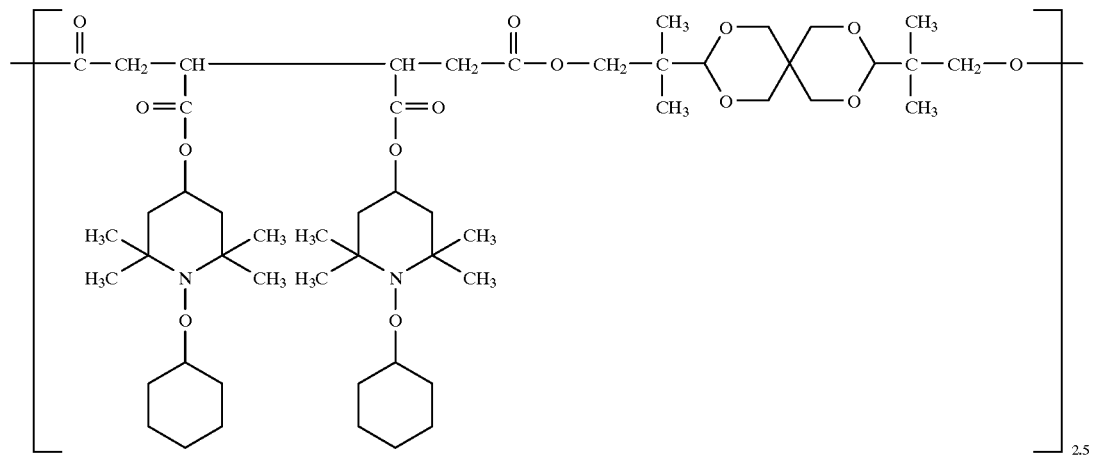

EXAMPLE 1

Light stabilization in polypropylene films.

100 parts of polypropylene block copolymer powder are homogenized with 0.05 part of pentaerythrityl tetrakis[3-(3, 5-di-tert-butyl-4-hydroxyphenyl)propionate], 0.10 part of tris[2,4-di-tert-butylphenyl] phosphite, 0.1 part of calcium stearate and the quantities of light stabilizers indicated in Table 1 in a Brabender plastograph at 200° C. for 10 minutes. The composition thus obtained is removed from the compounder as rapidly as possible and pressed in a toggle press to give a sheet with a thickness of 2–3 mm. A piece of the resultant green moulding is cut out and pressed between two high-gloss hard aluminium foils for 6 minutes at 260° C. using a laboratory hydraulic press to give a film with a thickness of 0.5 mm, which is immediately cooled in a water-cooled press. Sections each measuring 55 mm×9 mm are then punched out of this 0.5 mm film and are exposed in a SEPAP 12.24. These test specimens are removed from the exposure apparatus at regular intervals and tested for their carbonyl content in an IR spectrometer. The increase in the carbonyl absorbance on exposure is a measure of the photooxidative degradation of the polymer and is known from experience to be associated with a deterioration in the mechanical properties. The measure of the stabilizing effect is therefore the time ($T_{0.2\ measured}$) until a carbonyl absorbance of 0.2 is reached. The results are summarized in Table 1.

The synergistic effect is determined by comparing the calculated with the measured $T_{0.2}$ values. The $T_{0.2}$ values are calculated according to the law of additivity (B. Ranby and J. F. Rabek, Photodegradation, Photo-oxidation and Photostabilization of Polymers, Principles and Applications, a Wiley-Interscience Publication, 1975, pages 418–422) in accordance with the following equation:

$$T_{0.2\,calculated} = \frac{T_{0.2} - \text{Light stabilizer 1} + T_{0.2} - \text{Light stabilizer 2}}{2}$$

The mixture in question has a synergistic effect if $T_{0.2\,measured}$ is greater than $T_{0.2\,calculated}$.

$T_{0.2\,calculated}$ is likewise indicated in Table 1.

TABLE 1

Light stabilization in polypropylene films.

| Light stabilizer | $T_{0.2}$ measured in hours | $T_{0.2}$ calculated in hours |
|---|---|---|
| None (control) | 58 | |
| 0.1% a-1 | 450 | |
| 0.1% b-1 | 360 | |
| 0.1% c-2 | 575 | |
| 0.05% a-1 and 0.05% b-1 | 540 | 405 |
| 0.05% a-1 and 0.05% c-2 | 615 | 512 |

EXAMPLE 2

Light stabilization in polypropylene block copolymer films.

100 parts of polypropylene block copolymer powder are homogenized with 0.05 part of pentaerythrityl tetrakis[3-(3,5-di-tert-butyl-4-hydroxyphenyl)propionate], 0.10 part of tris[2,4-di-tert-butylphenyl] phosphite, 0.1 part of calcium stearate and the parts of light stabilizer indicated in Tables 2a and 2b for 10 minutes at 200° C. in a Brabender plastograph. The composition thus obtained is removed from the compounder as rapidly as possible and pressed in a toggle press to give a sheet with a thickness of 2-3 mm. A piece of the resultant green moulding is cut out and pressed between two high-gloss hard aluminium foils for 6 minutes at 260° C. by means of a laboratory hydraulic press to give a sheet with a thickness of 0.5 mm, which is immediately cooled in a water-cooled press. Pieces each measuring 60 mm×25 mm are then punched out of this 0.5 mm sheet and exposed to light in a WEATHER-OMETER Ci 65 (black standard temperature 63±2° C., no exposure to rainwater). These test specimens are removed from the exposure apparatus at regular intervals and tested for their carbonyl content in an IR spectrometer. The increase in the carbonyl absorbance on exposure is a measure of the photooxidative degradation of the polymer and is known from experience to be associated with a deterioration in the mechanical properties.

The time ($T_{0.2\,measured}$), until a carbonyl absorbance of 0.2 is reached is indicated in Tables 2a and 2b.

The synergistic effect can be determined by comparing the calculated with the measured $T_{0.2}$ values, in analogy to Example 1.

TABLE 2A

Light stabilization in polypropylene block copolymer films.

| Light stabilizer | $T_{0.2}$ measured in hours | $T_{0.2}$ calculated in hours |
|---|---|---|
| none | 145 | |
| 0.1% a-1 | 1155 | |
| 0.1% a-2 | 2280 | |
| 0.1% b-1 | 1430 | |
| 0.1% c-1 | 2880 | |

TABLE 2A-continued

Light stabilization in polypropylene block copolymer films.

| Light stabilizer | $T_{0.2}$ measured in hours | $T_{0.2}$ calculated in hours |
|---|---|---|
| 0.1% c-2 | 1950 | |
| 0.05% a-1 and 0.05% b-1 | 2020 | 1292 |
| 0.05% a-1 and 0.05% c-1 | 2300 | 2017 |
| 0.05% a-1 and 0.05% c-2 | 1960 | 1552 |
| 0.05% a-2 and 0.05% b-1 | 2420 | 1855 |
| 0.05% b-1 and 0.05% c-1 | 2360 | 2155 |
| 0.05% b-1 and 0.05% c-2 | 1910 | 1690 |
| 0.05% c-1 and 0.05% c-2 | 2480 | 2415 |

TABLE 2B

Light stabilization in polypropylene block copolymer films.

| Light stabilizer | $T_{0.2}$ measured in hours | $T_{0.2}$ calculated in hours |
|---|---|---|
| none | 145 | |
| 0.2% a-1 | 2230 | |
| 0.2% c-2 | 3360 | |
| 0.10% a-1 and 0.10% c-2 | 3020 | 2795 |

In a second series of tests, additional combinations are tested under the same conditions as above. The results are given in Table 3.

TABLE 3

Light stabilization in polypropylene block copolymer films.

| Light stabilizer | $T_{0.2}$ measured in hours | $T_{0.2}$ calculated in hours |
|---|---|---|
| none | 100 | |
| 0.2% a-1 | 2230 | |
| 0.2% a-2 | 4040 | |
| 0.2% b-1 | 1750 | |
| 0.2% d-1 | 1480 | |
| 0.2% d-2 | 480 | |
| 0.2% e-1 | 3180 | |
| 0.2% f-1 | 1560 | |
| 0.2% g-2 | 330 | |
| 0.2% k-1 | 1800 | |
| 0.1% a-1 and 0.1% d-1 | 2080 | 1855 |
| 0.1% a-1 and 0.1% d-2 | 1880 | 1355 |
| 0.1% a-1 and 0.1% e-1 | 3180 | 2705 |
| 0.1% a-1 and 0.1% f-1 | 2390 | 1895 |
| 0.1% a-1 and 0.1% g-2 | 1480 | 1280 |
| 01% a-1 and 0.1% k-1 | 2350 | 2015 |
| 0.1% a-2 and 0.1% d-1 | 3340 | 2760 |
| 0.1% a-2 and 0.1% d-2 | 3280 | 2260 |
| 0.1% a-2 and 0.1% e-1 | >4319 | 3610 |
| 0.1% a-2 and | 3700 | 2800 |

TABLE 3-continued

Light stabilization in polypropylene block copolymer films.

| Light stabilizer | $T_{0.2}$ measured in hours | $T_{0.2}$ calculated in hours |
|---|---|---|
| 0.1% f-1 | | |
| 0.1% a-2 and 0.1% g-2 | 2380 | 2185 |
| 0.1% a-2 and 0.1% k-1 | 3020 | 2920 |
| 0.1% b-1 and 0.1% d-1 | 1790 | 1615 |
| 0.1% b-1 and 0.1% d-2 | 1520 | 1115 |
| 0.1% b-1 and 0.1% e-1 | 3350 | 2465 |
| 0.1% b-1 and 0.1% k-1 | 2120 | 1775 |

EXAMPLE 3

Light stabilization in low-density polyethylene films.

100 parts of low-density (density=0.918 g/cm³) polyethylene powder are homogenized with 0.03 part of octadecyl 3-(3,5-di-tert-butyl-4-hydroxyphenyl)propionate and with the parts of light stabilizers indicated in Table 4 in a Brabender plastograph at 180° C. for 10 minutes. The composition thus obtained is removed from the compounder as rapidly as possible and pressed in a press to give a sheet with a thickness of 2–3 mm. A piece of the resultant green moulding is cut out and pressed between two high-gloss hard aluminium foils for 6 minutes at 170° C. using a laboratory hydraulic press to give a film with a thickness of 0.2 mm, which is immediately cooled in a water-cooled press. Sections each measuring 60 mm×25 mm are then punched out of this 0.2 mm film and are immersed for 24 hours in a 0.1 N $H_2SO_3$ solution. This is regarded as a simulation of acid rain. The samples are then exposed to light in a WEATHER-OMETER Ci 65 (black standard temperature 63±2° C., no simulated rainwater). These samples are removed from the exposure apparatus at regular intervals and are tested for their content of vinyl groups in an IR spectrometer. The increase in the vinyl absorbance (909 cm⁻¹) on exposure is a measure of the photooxidative degradation of the polymer and is known from experience to be associated with a deterioration in the mechanical properties.

The results are given in Table 4.

The synergistic effect can be determined by comparing the measured with the calculated vinyl absorbance after 4106 hours, the calculation being made in analogy to Example 1.

TABLE 4

Light stabilization in low-density polyethylene films.

| Light stabilizer | Vinyl absorbance after 4106 hours | Calculated vinyl absorbance |
|---|---|---|
| none | 0.125 after 592 hours | |
| 0.1% a-1 | 0.037 | |
| 0.1% a-2 | 0.023 | |
| 0.1% b-1 | 0.046 | |
| 0.1% d-1 | 0.100 | |
| 0.1% d-2 | >0.122 | |
| 0.1% e-1 | 0.059 | |
| 0.1% f-1 | 0.052 | |
| 0.1% g-2 | >0.100 | |

TABLE 4-continued

Light stabilization in low-density polyethylene films.

| Light stabilizer | Vinyl absorbance after 4106 hours | Calculated vinyl absorbance |
|---|---|---|
| 0.1% k-1 | 0.037 | |
| 0.05% a-1 and 0.05% d-1 | 0.031 | >0.068 |
| 0.05% a-1 and 0.05% d-2 | 0.021 | >0.080 |
| 0.05% a-1 and 0.05% e-1 | 0.000 | 0.048 |
| 0.05% a-1 and 0.05% f-1 | 0.025 | 0.045 |
| 0.05% a-1 and 0.05% g-2 | 0.024 | >0.068 |
| 0.05% a-1 and 0.05% k-1 | 0.000 | 0.037 |
| 0.05% a-2 and 0.05% d-1 | 0.030 | >0.040 |
| 0.05% a-2 and 0.05% d-2 | 0.029 | >0.072 |
| 0.05% a-2 and 0.05% e-1 | 0.023 | 0.041 |
| 0.05% a-2 and 0.05% f-1 | 0.023 | 0.061 |
| 0.05% a-2 and 0.05% g-2 | 0.028 | >0.062 |
| 0.05% b-1 and 0.05% d-1 | 0.067 | 0.073 |
| 0.05% b-1 and 0.05% d-2 | 0.052 | >0.084 |
| 0.05% b-1 and 0.05% e-1 | 0.042 | 0.052 |
| 0.05% b-1 and 0.05% f-1 | 0.042 | 0.049 |
| 0.05% b-1 and 0.05% g-2 | 0.051 | >0.073 |

What is claimed is:

1. A stabilizer mixture comprising at least two different compounds from the group consisting of components a), b), c), d), e), f), g) and k), where component a) is at least one compound of the formula a-I-1 or a-I-3,

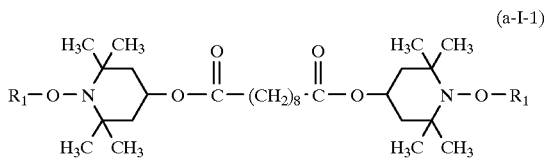

(a-I-1)

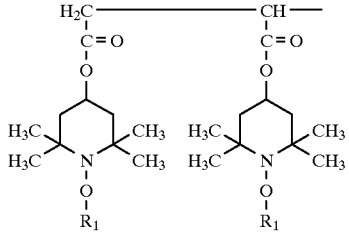

(a-I-3)

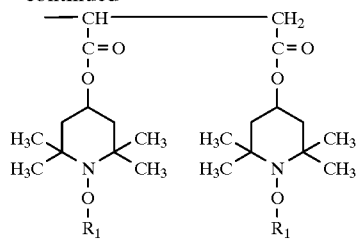
in which R₁ is methyl, octyl or cyclohexyl;
component b) is at least one compound of the formula b-II,
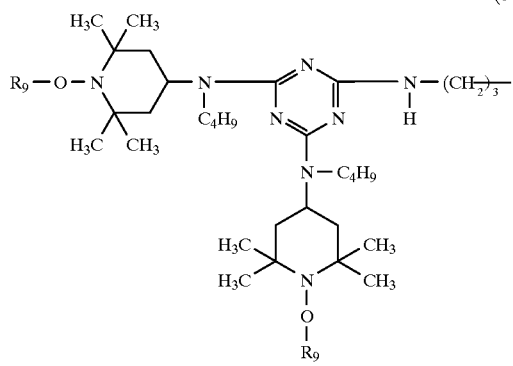
in which R₉ is as defined for R₁;
component c) is at least one compound of the formula c-V,
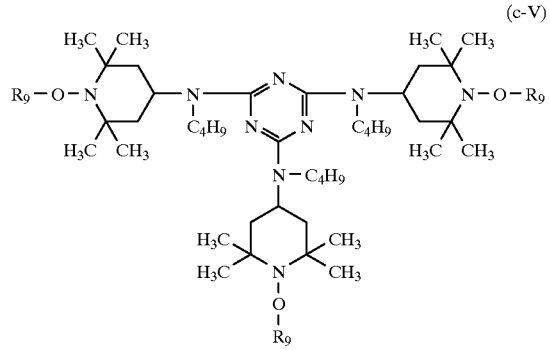
in which R₉ is as defined above;
component d) is at least one compound of the formula d-VI-1, d-VI-2 or d-VI-3,
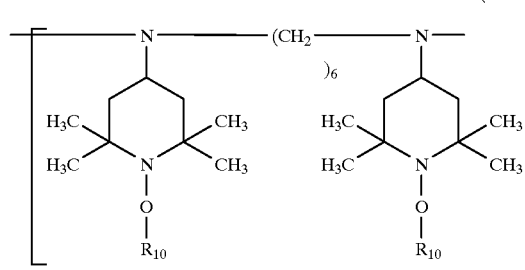
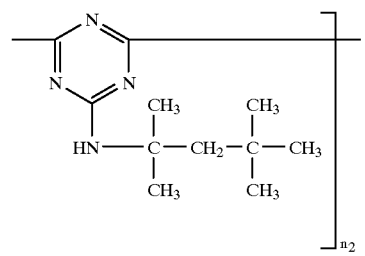
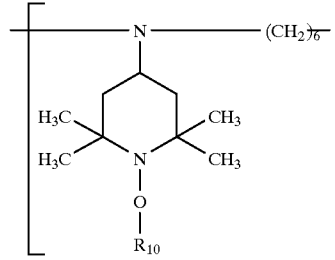
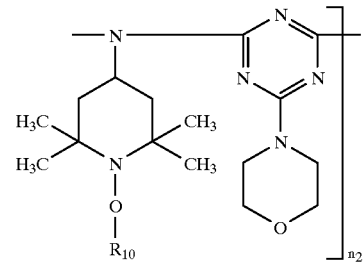

-continued

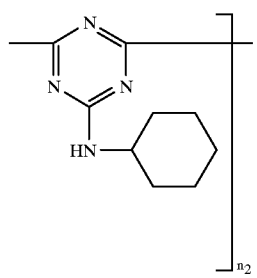

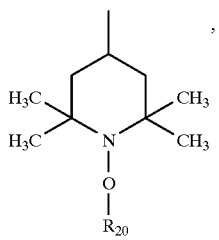

in which $R_{10}$ is as defined for $R_1$ and $n_2$ is a number from 2 to 25;

component e) is at least one compound of the formula e-VII, (e-VII)

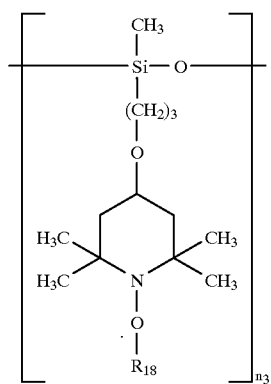

in which $R_{18}$ is as defined for $R_1$ and $n_3$ is a number from 1 to 25;

component f) is a product obtainable by reacting a product, obtained by reaction between a polyamine of the formula $$H_2N-(CH_2)_3-NH-(CH_2)_2-NH-(CH_2)_3-NH_2$$

and cyanuric chloride, with a compound of the formula

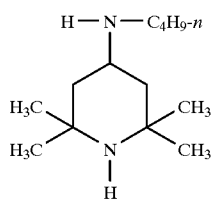

to form a triazine derivative which contains 2,2,6,6-tetramethyl-4-piperidyl groups, and then reacting the 2,2,6,6-tetramethyl-4-piperidyl groups present in the triazine derivative to form groups of the formula in which $R_{20}$ is as defined for $R_1$;

component g) is at least one compound of the formula g-IX-1 or g-IX-2, (g-IX-1)

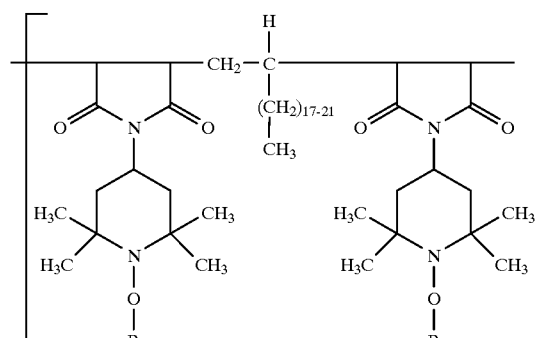

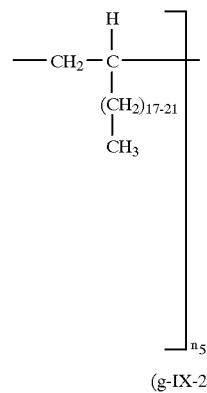

(g-IX-2)

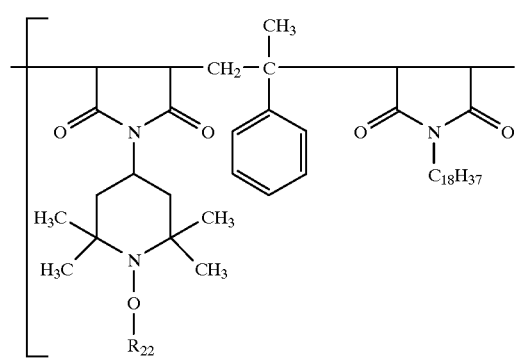

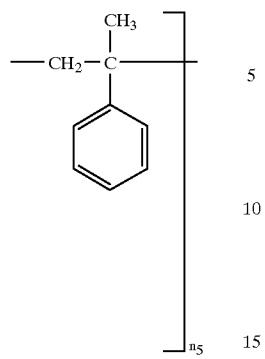

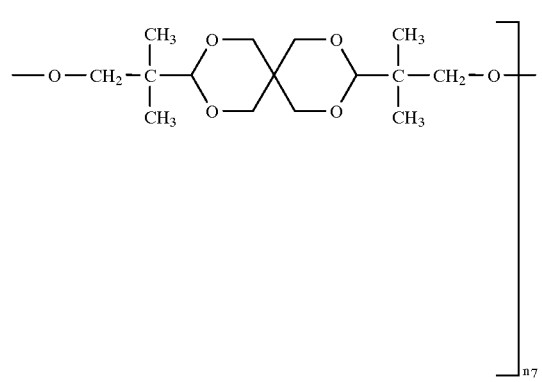

in which $R_{10}$ and $R_{22}$ are as defined for $R_1$ and $n_5$ is a number from 1 to 25; and component k) is at least one compound of the formula k-XIII,

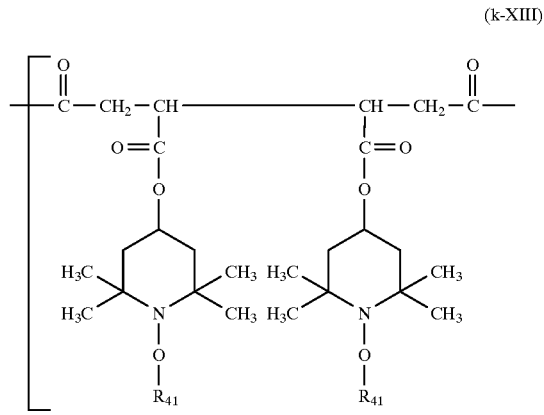

(k-XIII)

in which $R_{41}$ is as defined for $R_1$ and $n_7$ is a number from 1 to 25.

2. A stabilizer mixture according to claim 1, comprising at least one compound of component a) and at least one compound of component b), c), d), e), f), g), or k).

3. A stabilizer mixture according to claim 1, comprising at least one compound of component a) and at least one compound of component b), c), d), e), f), or g).

* * * * *